(12) United States Patent
Yan et al.

(10) Patent No.: US 12,538,132 B2
(45) Date of Patent: Jan. 27, 2026

(54) COMMUNICATION SYSTEM, COMMUNICATION METHOD, AND COMMUNICATION APPARATUS

(71) Applicant: HUAWEI TECHNOLOGIES CO., LTD., Guangdong (CN)

(72) Inventors: Xueqiang Yan, Shanghai (CN); Mingyu Zhao, Shanghai (CN); Jianjun Wu, Shanghai (CN); Xueli An, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 18/322,541

(22) Filed: May 23, 2023

(65) Prior Publication Data

US 2023/0300622 A1 Sep. 21, 2023

Related U.S. Application Data

(63) Continuation of application No. PCT/CN2021/107784, filed on Jul. 22, 2021.

(30) Foreign Application Priority Data

Nov. 24, 2020 (CN) .......................... 202011331946.8

(51) Int. Cl.
*H04L 29/06* (2006.01)
*H04L 9/08* (2006.01)
*H04L 9/32* (2006.01)
*H04W 12/02* (2009.01)
*H04W 12/71* (2021.01)

(52) U.S. Cl.
CPC ........... *H04W 12/71* (2021.01); *H04L 9/0869* (2013.01); *H04L 9/321* (2013.01); *H04W 12/02* (2013.01)

(58) Field of Classification Search
CPC .... H04W 12/71; H04W 12/02; H04L 9/0869; H04L 9/321
See application file for complete search history.

(56) References Cited

U.S. PATENT DOCUMENTS

2003/0101253 A1\* 5/2003 Saito ....................... H04L 45/02
709/223
2019/0379544 A1 12/2019 Suthar et al.

FOREIGN PATENT DOCUMENTS

| CN | 104168265 A | \* | 11/2014 |
| CN | 109644514 A | | 4/2019 |
| CN | 109923937 A | | 6/2019 |

(Continued)

*Primary Examiner* — Shawnchoy Rahman

(57) ABSTRACT

This disclosure provides a communication system and a communication method. The communication system may include a network service node (NSN) and a user service node (USN). The NSN communicates with the USN through an external interface. The NSN includes an authentication function entity and/or an access management function entity. The USN is associated with one more terminal devices. The USN includes the following function entities: a data forwarding function entity, a session management function entity, and a user data storage function entity. The function entities included in the USN communicate with each other through an internal interface. Based on the function entities included in the USN, the USN may provide a basic network service for the associated one or more terminal devices.

17 Claims, 9 Drawing Sheets

(56) References Cited

FOREIGN PATENT DOCUMENTS

| WO | WO-2018070436 A1 | * | 4/2018 | ......... H04L 12/1407 |
| WO | 2020029729 A1 | | 2/2020 | |

* cited by examiner

COMMUNICATION SYSTEM, COMMUNICATION METHOD, AND COMMUNICATION APPARATUS

CROSS-REFERENCE TO RELATED APPLICATIONS

This application is a continuation of International Application No. PCT/CN2021/107784, filed on Jul. 22, 2021, which claims priority to Chinese Patent Application No. 202011331946.8, filed on Nov. 24, 2020. The disclosures of the aforementioned applications are hereby incorporated by reference in their entireties.

TECHNICAL FIELD

This disclosure relates to the communication field, and more specifically, to a communication system, a communication method, and a communication apparatus.

BACKGROUND

In a 5th generation (5th Generation, 5G) network in the 3rd Generation Partnership Project (3rd Generation Partnership Project, 3GPP), core network elements have excessively large entities and various types, resulting in excessive signaling interaction. This brings high costs and increases a risk point of being vulnerable to an attack.

SUMMARY

This disclosure provides a communication system, a communication method, and a communication apparatus, to reduce network complexity.

According to a first aspect, a communication system is provided. The communication system includes a network service node (network service node, NSN) and a user service node (user service node, USN). The NSN communicates with the USN through an external interface. The NSN includes an authentication function entity and/or an access management function entity. The USN is associated with one terminal device or a group of terminal devices. The USN includes the following function entities: a data forwarding function entity, a session management function entity, and a user data storage function entity. The function entities included in the USN communicate with each other through an internal interface.

That the NSN communicates with the USN through an external interface indicates that a standard interface and a standard communication protocol need to be defined for an interface between the NSN and USN. The standard interface may be an existing standard interface, or may be a newly defined standard interface. The standard communication protocol may be an existing standard communication protocol, or may be a newly defined standard communication protocol.

That the function entities included in the USN communicate with each other through the internal interface indicates that the standard interface or the standard communication protocol does not need to be defined for an interface between the function entities included in the USN. For example, if two function entities included in the USN are implemented by software, the two function entities may communicate with each other invoking a simple internal function.

Based on the foregoing technical solutions, the communication system including two types of network elements (the NSN and the USN) is proposed. The NSN communicates with the USN through the external interface, and the function entities included in the USN communicate with each other through the internal interface. In this way, when the communication system can provide a network service for the terminal device, external interfaces, protocols, and signaling interaction in the communication system are reduced, and complexity of the communication system is reduced.

In addition, the USN is associated with one terminal device or a group of terminal devices, so that the USN can provide a personalized service for the associated terminal device or the group of associated terminal devices. This can meet ultra-high personalized service requirements, quality of service (quality of service, QoS), and the like of different terminal devices, to implement user-centricity. A user-centric communication system is more suitable for multi-terminal device type requirements for connectivity of everything.

In a possible implementation, the NSN and the USN are core network elements.

In a possible implementation, when the NSN includes the authentication function entity and the access management function entity, the authentication function entity and the access management function entity may communicate with each other through the internal interface. The authentication function entity and the access management function entity included in the NSN may be disposed separately, or may be disposed in an integrated manner.

In a possible implementation, the data forwarding function entity, the session management function entity, and the user data storage function entity included in the USN may be disposed separately, or may be disposed in the integrated manner.

With reference to the first aspect, in some implementations of the first aspect, the USN further includes at least one of the following function entities that perform communication through the internal interface: a policy management function entity, an authentication and authorization function entity, or a mobility management function entity.

Based on the foregoing technical solutions, when the USN includes the policy management function entity, the USN may provide a policy management function for the associated terminal device or the group of associated terminal devices. When the USN includes the authentication and authorization function entity, the USN may implement functions of performing authentication and authorization on the terminal device, verifying validity of a network, or performing authentication on an association relationship between the terminal device and the USN. When the USN includes the mobility management function entity, the USN may provide a mobility management service for a terminal device with high mobility and a terminal device with low mobility.

With reference to the first aspect, in some implementations of the first aspect, the NSN is configured to configure one or more of the following content for the USN: a storage resource, a computing resource, a network resource, a central processing unit, a database, and a personalized parameter. The personalized parameter is configured by the NSN for the USN based on a terminal device served by the USN.

The personalized parameter may be configured by the NSN based on a type of a terminal device served by the USN, a quantity of terminal devices served by the USN, or the like. For example, if the terminal device served by the USN is a non-mobile terminal device, the NSN may not configure a paging function in mobility management for the USN. For another example, if the terminal device served by the USN is an internet of things terminal device of a machine type, the NSN may not configure a voice function in session management for the USN. For still another example, based on different quantities of terminal devices served by the USN, the NSN may configure different storage resources, computing resources, network resources, or other resources for the USN. For still another example, for a customized service enabled, through negotiation with an operator, by the terminal device served by the USN, the NSN may configure a powerful graphics processing (graphics processing unit, GPU) computing resource, an artificial intelligence (artificial intelligence, AI) capability, and the like for the USN.

Based on the foregoing technical solutions, the NSN may configure different parameters, resources, and the like for the USN, so that the USN can provide the customized service for different terminal devices.

With reference to the first aspect, in some implementations of the first aspect, the NSN further includes a life cycle management (life cycle management, LCM) function entity. The LCM function entity is configured to perform life cycle management on the USN.

Based on the foregoing technical solutions, the NSN may manage a life cycle of the USN by using the LCM function entity, for example, activate the USN or deactivate the USN.

With reference to the first aspect, in some implementations of the first aspect, the USN is a node in a distributed hash table DHT.

Based on the foregoing technical solutions, distributed storage of data can be implemented.

With reference to the first aspect, in some implementations of the first aspect, the user data storage function entity is configured to store first information. The first information includes one or more of the following: information that needs privacy protection, identification information of the terminal device served by the USN, and identity information of a user.

Based on the foregoing technical solutions, the USN stores the information that needs privacy protection, identity information of the terminal device, or the identity information of the user. In comparison with centralized storage in a conventional technology, security of user privacy data can be improved.

With reference to the first aspect, in some implementations of the first aspect, the communication system further includes a consortium blockchain. The consortium blockchain is for storing second information. The second information includes one or more of the following: a transaction record between a user and an operator, and a public key of an operator network. A storage address of the second information in the consortium blockchain is indicated by the first information.

Based on the foregoing technical solutions, trustworthiness certification of a data source and data integrity can be implemented by combining the consortium blockchain and storing information such as the transaction record between the user and the operator in the consortium blockchain.

With reference to the first aspect, in some implementations of the first aspect, the USN is further configured to receive indication information from the terminal device. The indication information indicates the USN to provide a part or all of the first information for a third party. The USN is further configured to provide the part or all of the first information for the third party.

Based on the foregoing technical solutions, the USN provides the part or all of the first information for the third party based on an indication of the terminal device, so that independent control of the user privacy data can be implemented.

With reference to the first aspect, in some implementations of the first aspect, the user data storage function entity is further configured to store a mapping relationship. The mapping relationship includes at least one of the following: a mapping relationship between identity information of a user and an identity of the user in an application, or a mapping relationship between the identity information of the user and an address.

Based on the foregoing technical solutions, when the application is obtained, the identity information of the user may be determined based on the application, or the address of the user may be determined based on the identity information of the user, without a need of exposing all information of the user. An objective of privacy protection is achieved.

With reference to the first aspect, in some implementations of the first aspect, the NSN is configured to receive a first request message from the terminal device via an access network device. The first request message is for requesting access. The first request message includes the identification information of the terminal device. The NSN obtains an identifier of the USN. The identifier of the USN is associated with the identification information of the terminal device. The NSN is further configured to associate the USN with the terminal device.

Based on the foregoing technical solutions, based on a request of the terminal device, the NSN may obtain the identifier of the USN based on the identification information of the terminal device, and associate the USN with the terminal device, so that the USN allocated by the operator to the terminal device can be activated, and the USN can provide a dedicated network service for the terminal device.

With reference to the first aspect, in some implementations of the first aspect, the USN is a first USN. The first USN is configured to receive data from a first terminal device. The data includes identification information of a second terminal device. The first USN is further configured to obtain an identifier of a second USN. The identifier of the second USN is associated with the identification information of the second terminal device. The first USN is further configured to send the data to the second USN. The data is sent to the second terminal device by using the second USN.

Based on the foregoing technical solutions, a data forwarding procedure between the first terminal device and the second terminal device may be implemented by using the first USN and the second USN.

According to a second aspect, a communication method is provided. The method may include: A terminal device sends a first request message to an NSN via an access network device. The first request message is for requesting access. The first request message includes identification information of the terminal device. The terminal device establishes a connection to a USN. The USN is activated by the NSN for the terminal device. The USN is associated with the identification information of the terminal device.

Based on the foregoing technical solutions, the NSN may activate, based on a request of the terminal device, the USN associated with the identification information of the terminal device, so that the terminal device can establish the connection to the USN. Further, the USN can provide a dedicated network service for the terminal device.

With reference to the second aspect, in some implementations of the second aspect, the method may further include: The terminal device sends digital credential information to the USN. The digital credential information includes a digital credential, or the digital credential information indicates the digital credential.

The digital credential may include one or more of the following: a digital credential signed by an operator, a digital credential signed by a bank, a digital credential signed by an identity management organization, and a digital credential signed by a university.

The digital credential may be obtained by a service provider (for example, the operator, the bank, the identity management organization, or the university) by signing a credential of a user by using a private key of the service provider. For example, the digital credential signed by the operator may be obtained by signing subscription content between the operator and the user based on a private key of the operator network. The digital credential signed by the bank may be obtained by signing credit investigation information, property information, and the like of the user based on a private key of a digital asset management organization of the bank. The digital credential signed by the identity management organization may be obtained by signing the identity information of the user based on a private key of the identity management organization. The digital credential signed by the university may be obtained by signing graduation certificate information of the user based on a private key of a digital asset management organization of the university.

Based on the foregoing technical solutions, the terminal device sends the digital credential to the USN serving the terminal device, so that the USN can store the digital credential, and an objective of privacy protection is achieved.

With reference to the second aspect, in some implementations of the second aspect, the method may further include: The terminal device receives a second request message from a third party. The second request message is for requesting a part or all of the digital credential. The terminal device sends indication information to the USN. The indication information indicates the USN to provide a part or all of the digital credential for the third party.

Based on the foregoing technical solutions, the terminal device indicates the USN to provide a part or all of the digital credential for the third party only when receiving a request from the third party, so that independent control of the digital credential can be implemented, and the objective of privacy protection is achieved.

With reference to the second aspect, in some implementations of the second aspect, the USN is a node in a distributed hash table.

Based on the foregoing technical solutions, distributed storage of data can be implemented.

According to a third aspect, a communication method is provided. The method may include: An NSN receives a first request message from a terminal device via an access network device. The first request message is for requesting access. The first request message includes identification information of the terminal device. The NSN obtains an identifier of a USN. The identifier of the USN is associated with the identification information of the terminal device. The NSN associates the USN with the terminal device.

Based on the foregoing technical solutions, based on a request of the terminal device, the NSN may obtain the identifier of the USN based on the identification information of the terminal device, and associate the USN with the terminal device, so that the USN allocated by an operator to the terminal device can be activated, and the USN can provide a dedicated network service for the terminal device.

According to a fourth aspect, a communication method is provided. The method may include: A first USN receives digital credential information. The digital credential information includes a digital credential, or the digital credential information indicates the digital credential. The first USN stores the digital credential. The digital credential further indicates a storage address of information corresponding to the digital credential in a consortium blockchain.

For descriptions of the digital credential, refer to the descriptions in the second aspect.

Based on the foregoing technical solutions, the digital credential is stored in the first USN of a first terminal device, and the information corresponding to the digital credential is stored in the consortium blockchain, so that privacy protection and data security and reliability can be implemented.

With reference to the fourth aspect, in some implementations of the fourth aspect, the method further includes: The first USN receives indication information from the first terminal device. The indication information indicates the first USN to provide a part or all of the digital credential for a third party. The first USN provides a part or all of the digital credential for the third party.

Based on the foregoing technical solutions, the first terminal device may send the indication information to the first USN, to indicate the first USN to provide a part or all of the digital credential for the third party, so that independent control of privacy data can be implemented.

With reference to the fourth aspect, in some implementations of the fourth aspect, the first USN is a node in a distributed hash table.

Based on the foregoing technical solutions, distributed storage of data can be implemented.

With reference to the fourth aspect, in some implementations of the fourth aspect, the method further includes: The first USN receives data from the first terminal device. The data includes identification information of a second terminal device. The first USN obtains an identifier of a second USN. The identifier of the second USN is associated with the identification information of the second terminal device. The first USN sends the data to the second USN. The data is sent to the second terminal device by using the second USN.

Based on the foregoing technical solutions, a data forwarding procedure between the first terminal device and the second terminal device may be implemented by using the first USN and the second USN.

According to a fifth aspect, a communication system is provided. The communication system includes an NSN and a USN. The NSN communicates with the USN through an external interface. The NSN includes an authentication function entity and/or an access management function entity. The USN is associated with only one terminal device or a group of terminal devices. The USN includes at least two of the following function entities: a data forwarding function entity, a session management function entity, a user data storage function entity, a policy management function entity, an authentication and authorization function entity, and a mobility management function entity. The at least two function entities included in the USN communicate with each other through an internal interface.

Based on the foregoing technical solutions, the communication system including two types of network elements (the NSN and the USN) is proposed. The NSN communicates with the USN through the external interface, and the at least two function entities included in the USN communicate with each other through the internal interface. In this way, when the communication system can provide a network service for the terminal device, external interfaces, protocols, and signaling interaction in the communication system are reduced, and complexity of the communication system is reduced.

In addition, the USN is associated with one terminal device or a group of terminal devices, so that the USN can provide a personalized service for the associated terminal device or the group of associated terminal devices. This can meet ultra-high personalized service requirements, quality of service (quality of service, QoS), and the like of different terminal devices, to implement user-centricity. A user-centric communication system is more suitable for multi-terminal device type requirements for connectivity of everything.

According to a sixth aspect, a communication apparatus is provided. The communication apparatus includes a transceiver unit and a processing unit. The transceiver unit is configured to send a first request message to an NSN via an access network device. The first request message is for requesting access, and the first request message includes identification information of the communication apparatus. The processing unit is configured to establish a connection to a user service node USN by using the NSN. The USN is associated with the identification information of the communication apparatus.

With reference to the sixth aspect, in some implementations of the sixth aspect, the transceiver unit is further configured to send digital credential information to the USN. The digital credential information includes a digital credential, or the digital credential information indicates the digital credential.

With reference to the sixth aspect, in some implementations of the sixth aspect, the transceiver unit is further configured to receive a second request message. The second request message is for requesting a part or all of the digital credential. The transceiver unit is further configured to send indication information to the USN. The indication information indicates the USN to provide a part or all of the digital credential for a third party.

With reference to the sixth aspect, in some implementations of the sixth aspect, the USN is a node in a distributed hash table.

According to a seventh aspect, a communication apparatus is provided. The communication apparatus includes a processing unit and a transceiver unit. The transceiver unit is configured to receive a first request message from a terminal device via an access network device. The first request message is for requesting access. The first request message includes identification information of the terminal device. The processing unit is configured to obtain an identifier of a USN. The identifier of the USN is associated with the identification information of the terminal device. The processing unit is further configured to associate the USN with the terminal device.

According to an eighth aspect, a communication apparatus is provided. The communication apparatus includes a processing unit and a transceiver unit. The transceiver unit is configured to receive digital credential information. The digital credential information includes a digital credential, or the digital credential information indicates the digital credential. The processing unit is configured to store the digital credential. The digital credential further indicates a storage address of information corresponding to the digital credential in a consortium blockchain.

With reference to the eighth aspect, in some implementations of the eighth aspect, the transceiver unit is further configured to receive indication information from a first terminal device. The indication information indicates a first USN to provide a part or all of the digital credential for a third party. The transceiver unit is further configured to provide the part or all of the digital credential for the third party.

With reference to the eighth aspect, in some implementations of the eighth aspect, the communication apparatus is a node in a distributed hash table.

With reference to the eighth aspect, in some implementations of the eighth aspect, the transceiver unit is further configured to receive data from the first terminal device. The data includes identification information of a second terminal device. The processing unit is further configured to obtain an identifier of a second USN. The identifier of the second USN is associated with the identification information of the second terminal device. The transceiver unit is further configured to send the data to the second USN. The data is sent to the second terminal device by using the second USN.

According to a ninth aspect, a communication apparatus is provided. The communication apparatus includes a processor. The processor is coupled to a memory, and may be configured to execute instructions in the memory, to implement the method in any one of the second aspect and the possible implementations of the second aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in the terminal device. When the communication apparatus is the chip configured in the terminal device, the communication interface may be the input/output interface.

Optionally, the transceiver may be a transceiver circuit. Optionally, the input/output interface may be an input/output circuit.

According to a tenth aspect, a communication apparatus is provided. The communication apparatus includes a processor. The processor is coupled to a memory, and may be configured to execute instructions in the memory, to implement the method in any one of the third aspect and the possible implementations of the third aspect. Optionally, the communication apparatus further includes the memory. Optionally, the communication apparatus further includes a communication interface, and the processor is coupled to the communication interface.

In an implementation, the communication apparatus is an NSN. When the communication apparatus is the NSN, the communication interface may be a transceiver or an input/output interface.

In another implementation, the communication apparatus is a chip disposed in the NSN. When the communication apparatus is the chip disposed in the NSN, the communication interface may be the input/output interface.

Optionally, the transceiver may be a transceiver circuit. Optionally, the input/output interface may be an input/output circuit.

According to an eleventh aspect, a communication apparatus is provided. The communication apparatus includes a processor. The processor is coupled to a memory, and may be configured to execute instructions in the memory, to implement the method in any one of the fourth aspect and the possible implementations of the fourth aspect. Optionally, the communication apparatus further includes the memory. Optionally, the communication apparatus further includes a communication interface, and the processor is coupled to the communication interface.

In an implementation, the communication apparatus is a first USN. When the communication apparatus is the first USN, the communication interface may be a transceiver or an input/output interface.

In another implementation, the communication apparatus is a chip disposed in the first USN. When the communication apparatus is the chip disposed in the first USN, the communication interface may be the input/output interface.

Optionally, the transceiver may be a transceiver circuit. Optionally, the input/output interface may be an input/output circuit.

According to a twelfth aspect, a processor is provided. The processor includes an input circuit, an output circuit, and a processing circuit. The processing circuit is configured to receive a signal through the input circuit, and transmit the signal through the output circuit, to enable the processor to perform the method in any one of the possible implementations of the second aspect to the fourth aspect.

In a specific implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit. The circuit is used as the input circuit and the output circuit at different moments. Specific implementations of the processor and the various circuits are not limited in embodiments of this disclosure.

According to a thirteenth aspect, a processing apparatus is provided. The processing apparatus includes a processor and a memory. The processor is configured to read instructions stored in the memory, receive a signal through a receiver, transmit a signal through a transmitter, and perform the method in any one of the possible implementations of the second aspect to the fourth aspect.

Optionally, there are one or more processors, and there are one or more memories.

Optionally, the memory may be integrated with the processor, or the memory and the processor are separately disposed.

In a specific implementation process, the memory may be a non-transitory (non-transitory) memory, such as a read-only memory (read-only memory, ROM). The memory and the processor may be integrated into one chip, or may be separately disposed in different chips. A type of the memory and a manner in which the memory and the processor are disposed are not limited in this embodiment of this disclosure.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the thirteenth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a fourteenth aspect, a computer program product is provided. The computer program product includes a computer program (which may also be referred to as code or instructions). When the computer program is run, a computer is enabled to perform the method in any one of the possible implementations of the second aspect to the fourth aspect.

According to a fifteenth aspect, a computer-readable storage medium is provided. The computer-readable storage medium stores a computer program (which may also be referred to as code or instructions). When the computer program is run on a computer, the method in any one of the possible implementations of the second aspect to the fourth aspect is performed.

DESCRIPTION OF EMBODIMENTS

The following describes technical solutions of this disclosure with reference to accompanying drawings.

The technical solutions in embodiments of this disclosure may be applied to various communication systems, for example, a 6th generation (6th GENERATION, 6G) communication system or a future communication system.

A terminal device in embodiments of this disclosure may include various handheld devices, vehicle-mounted devices, wearable devices, or computing devices that have a wireless communication function, or other processing devices connected to a wireless modem. The terminal may be a mobile station (mobile station, MS), a subscriber unit (subscriber unit), user equipment (user equipment, UE), a cellular phone (cellular phone), a smart phone (smart phone), a wireless data card, a personal digital assistant (personal digital assistant, PDA) computer, a tablet computer, a wireless modem (modem), a handheld device (handset), a laptop computer (laptop computer), a machine type communication (machine type communication, MTC) terminal, or the like.

An existing communication network becomes increasingly complex, and network elements are excessively large and various, resulting in excessive interfaces, protocols, and signaling interaction. This brings high costs and increases a risk point of being vulnerable to an attack.

Figure 1:
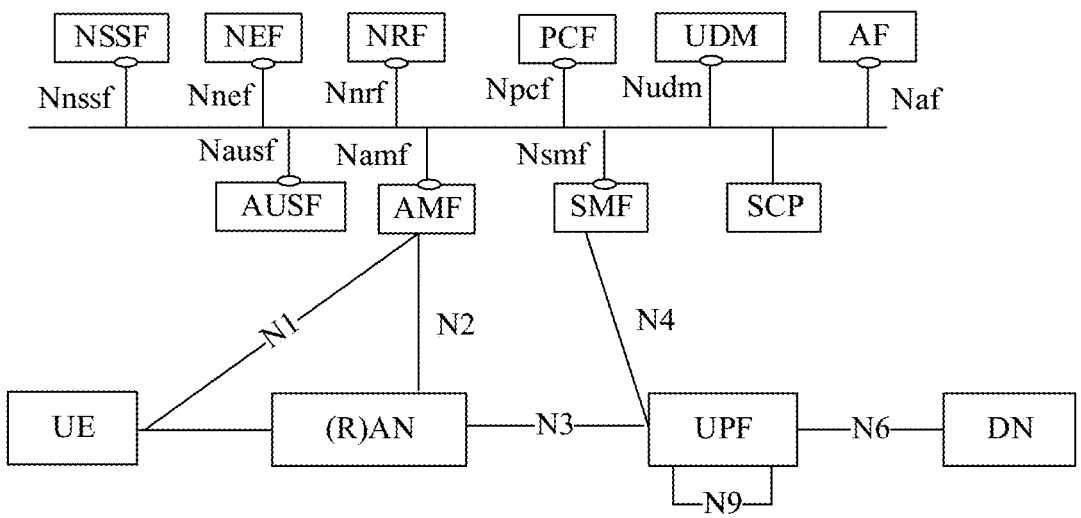
FIG. 1 is a schematic diagram of a 5G network architecture.

For example, in a 5G core network architecture shown in FIG. 1, decoupling and integration between network functions are implemented through modularization, a user plane function (user plane function, UPF) network element entity serves as a fixed anchor to support mobility management, and requirements of different types of services are met through network slicing.

However, an existing core network architecture and a fixed anchor have a single-point failure risk. User data is stored on a core network in a centralized manner. This has a security risk and a privacy risk. The UPF serves a city-level user in a centralized manner. This has problems of a non-optimal path and latency. Network slicing is a logical network for a specific type of service. A user needs to adapt to the network. In comparison with a single-user requirement, a granularity is excessively large. There are many network element types and interfaces, causing high complexity.

In addition, based on an existing communication system, there is no trustworthiness and security mechanism for privacy and ownership of personal data (personal data distributed on entities such as a home subscription server/unified data management entity on an operator network and personal data on various applications are not owned and controlled by the user), and it is difficult to meet an increasingly strict data privacy protection trend and requirement.

In view of this, embodiments of this disclosure provide a user-centric (user centric-network, UCN) network architecture, to reduce network complexity, improve network security, and meet a requirement of the user for a personalized service and privacy data protection.

Figure 2:
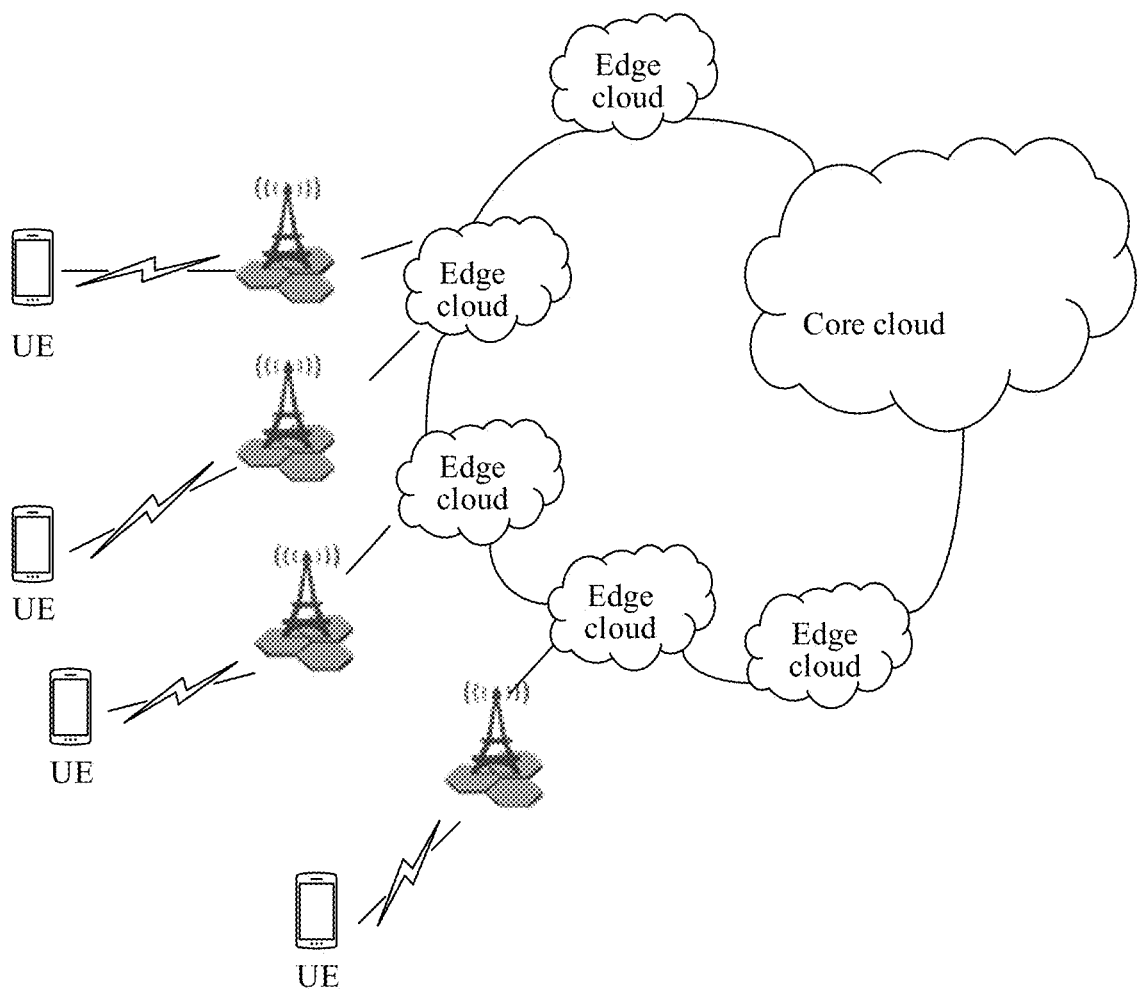
FIG. 2 is a schematic diagram of edge cloud deployment.

FIG. 2 is a schematic diagram of an application scenario applicable to a communication system according to an embodiment of this disclosure. As shown in FIG. 2, an edge cloud and a core cloud achieve collaboration and complementation. The core cloud may perform management and control on the edge cloud in a unified manner. The edge cloud is closer to a user, can better support an application that has a high requirement on latency, data privacy, and the like, and is suitable for distributed deployment of network functions. UE may access the edge cloud via an access network device, and communicate with the edge cloud.

The edge cloud is a type of a public cloud. Based on a widely covered small site, the edge cloud is generally a content delivery network (content delivery network, CDN), a point of presence (point of presence, POP), and mobile edge computing (mobile edge computing, MEC). Each node provides a public cloud service in a small cluster form.

The following describes in detail embodiments provided in this disclosure with reference to the accompanying drawings.

Figure 3:
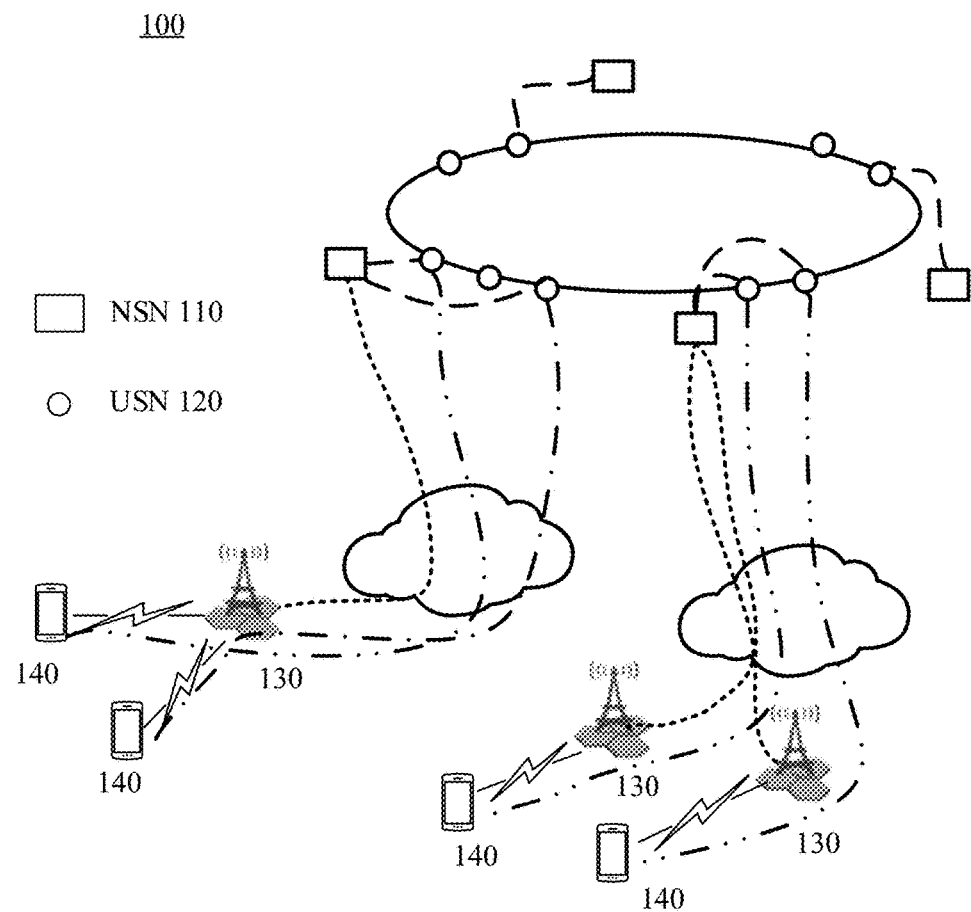
FIG. 3 is a schematic diagram of a communication system according to an embodiment of this disclosure.

FIG. 3 is a schematic diagram of a communication system according to an embodiment of this disclosure. As shown in FIG. 3, a communication system 100 may include a network service node (network service node, NSN) 110 and a user service node (user service node, USN) 120. It should be understood that FIG. 3 is merely an example, and shows that the communication system 100 includes four NSNs 110 and nine USNs 120. In actual deployment, the communication system 100 may include a more quantity of NSNs 110 and/or a more quantity of USNs 120.

The NSN 110 is an initial access point of a terminal device on a core network side, and is directly deployed and managed by a network operator. The NSN 110 may be independently deployed, or may be deployed on an edge cloud or an access network device 130. The NSN 110 may activate the USN 120, and may perform life cycle management on the USN 120. The NSN 110 may manage one or more USNs 120, and the NSN 110 may communicate with the USN 120 managed by the NSN 110 through an external interface (which may be referred to as a communication interface). The NSN 110 serves one or more access network devices 130, and the NSN 110 may communicate with the access network device 130 served by the NSN 110 through the communication interface. The terminal device 140 may communicate with the NSN 110 via the access network device 130.

It should be understood that, that the NSN communicates with the USN through the external interface indicates that a standard interface and a standard communication protocol need to be defined for an interface between the NSN and the USN. The standard interface may be an existing standard interface, or may be a newly defined standard interface. The standard communication protocol may be an existing standard communication protocol, or may be a newly defined standard communication protocol.

That the NSN 110 is the initial access point of the terminal device on the core network side may be understood as follows: In a process in which the terminal device accesses the core network via the access network device, the terminal device is first connected to the NSN 120, and then the terminal device may be connected to the USN 120 by using the NSN 120.

That the NSN 110 activates the USN 120 may be understood as follows: In a process in which the terminal device 140 initially accesses a network, the NSN 110 activates, based on a request of the terminal device, the USN 120 serving the terminal device, and associates the terminal device with the USN 120. For example, a step of activating the USN 120 by the NSN 110 may be described as follows:

The NSN receives a first request message from the terminal device via the serving access network device. The first request message is for requesting access, and the first request message includes identification information of the terminal device. The NSN obtains an identifier of the USN. The identifier of the USN is associated with the identification information of the terminal device. The NSN further associates the USN with the terminal device.

That the identifier of the USN is associated with the identification information of the terminal device may be understood as that there is a mapping relationship between the identifier of the USN and the identification information of the terminal device. In other words, when the identification information of the terminal device is obtained, the identifier of the USN may be obtained based on the mapping relationship between the identification information of the terminal device and the identifier of the USN.

That the identifier of the USN is associated with the identification information of the terminal device may alternatively be understood as that the identifier of the USN may be obtained by processing the identification information of the terminal device. For example, the identifier of the USN may be obtained by performing hash calculation on the identification information of the terminal device.

The NSN 110 may further configure one or more of the following content for the USN 120: a storage resource, a computing resource, a network resource, a central processing unit (central processing unit, CPU), a storage database, and a personalized parameter.

The storage resource may be a resource needed by the USN 120 to store computer instructions, and the like. The computing resource may be a resource needed by the USN 120 to execute computer instructions. For example, the computing resource may be a powerful graphics processing (graphics processing unit, GPU) computing resource. The network resource may be a resource required for communication between the USN 120 and the NSN 110, the terminal device, or the like. The central processing unit may be configured to execute computer instructions and the like. The database may be configured to store first information and the like. The first information is described in detail below, and details are not described herein. The database may alternatively be a distributed storage database.

The personalized parameter may be configured by the NSN based on a type of a terminal device served by the USN, a quantity of terminal devices served by the USN, or the like. For example, if the terminal device served by the USN is a non-mobile terminal device, the NSN may not configure a paging function in mobility management for the USN. For another example, if the terminal device served by the USN is an internet of things terminal device of a machine type, the NSN may not configure a voice function in session management for the USN. For still another example, based on different quantities of terminal devices served by the USN, the NSN may configure different storage resources, computing resources, network resources, or other resources for the USN. For still another example, for a customized service enabled, through negotiation with an operator, by the terminal device served by the USN, the NSN may configure a powerful GPU computing resource, an artificial intelligence (artificial intelligence, AI) capability, and the like for the USN.

The USN 120 is associated with the terminal device 140, belongs to the terminal device 140 exclusively, and provides all network services for the terminal device 140, for example, mobility management (mobile management, MM), session management (session management, SM), policy management (policy management, PM), and data forwarding. The USN 120 may communicate, via the access network device 130, with the terminal device 140 associated with the USN 120. In other words, the USN 120 may communicate with the access network device 130 through the communication interface.

That the USN 120 is a first USN is used as an example. Steps of providing, by the USN 120, data forwarding for the terminal device may be described as follows:

The first USN receives data from a first terminal device. The data includes identification information of a second terminal device. The first USN obtains an identifier of a second USN, and the identifier of the second USN is associated with the identification information of the second terminal device. The first USN sends the data to the second USN, and the data may be sent to the second terminal device by using the second USN.

Figure 4:
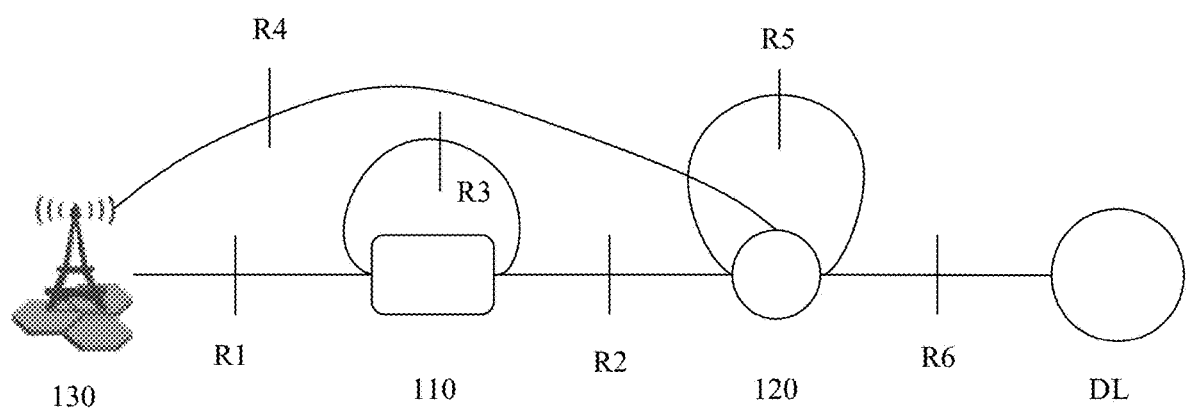
FIG. 4 is a schematic diagram of communication interfaces between an NSN, a USN, and an access network device.

Communication interfaces between an NSN 110, a USN 120, and an access network device 130 are shown in FIG. 4. R1 is a communication interface between the NSN 110 and the access network device 130; R2 is a communication interface between the NSN 110 and the corresponding USN 120; R3 is a communication interface between the NSN 110 and another NSN 110; R4 is a communication interface between the access network device 130 and the USN 120, and the access network device 130 and the USN 120 implement forwarding of all control plane signaling and data through the R4 interface; and R5 is a communication interface between the USN 120 and another USN 120. It should be understood that, in embodiments of this disclosure, only an example in which the communication interfaces between the NSN 110, the USN 120, and the access network device 130 are named R1 to R5 is used, and should not constitute any limitation on embodiments of this disclosure.

In a possible implementation, the USN 120 may be associated with one terminal device or a group of terminal devices, and exclusively belongs to the terminal device or the group of terminal devices. All terminal devices 140 in the group of terminal devices may be terminal devices in a same area, may be terminal devices in a same enterprise, may be terminal devices having a same network requirement, or the like. This is not limited in embodiments of this disclosure.

In a possible implementation, the USNs 120 may form a distributed hash table (distributed hash table, DHT), and the USN 120 may be considered as a node in the DHT. It should be understood that, in this case, the NSN 110 operates outside the DHT, but helps the USN 120 configure the DHT, that is, the NSN 110 is an initial contact point at which the USN 120 joins the DHT.

In a possible implementation, with reference to the application scenario shown in FIG. 2, the USN 120 may be deployed in the edge cloud in a distributed manner.

Structures of an NSN 110 and a USN 120 are described below with reference to FIG. 5 and FIG. 6.

The NSN 110 is an initial access point of a terminal device on a core network side, and the NSN 110 has some lightweight core network functions, for example, authentication and default connection establishment. The NSN 110 may include an access management function entity and/or an authentication (authentication, AUTH) function entity. For example, the NSN 110 shown in FIG. 5 includes an access management function entity 111 and an authentication function entity 112.

The access management function entity is configured to interconnect with an access network device, and perform registration, reachability management, access authorization, or the like on the terminal device. If the terminal device does not need registration, reachability management, access authorization, or the like, the NSN 110 may include no access management function entity. The access management function entity may be software, hardware, a combination of software and hardware, or the like. An entity that can implement an access management function may be equivalent to the access management function entity in embodiments of this disclosure.

The AUTH function entity is configured to perform authentication on a user. If no authentication needs to be performed on the user, the NSN 110 may include no AUTH function entity. The AUTH function entity may be software, hardware, a combination of software and hardware, or the like. An entity that can implement an authentication function may be equivalent to the AUTH function entity in embodiments of this disclosure.

In a possible implementation, the NSN 110 may further have a function of performing life cycle management on the USN 120. For example, as shown in FIG. 5, the NSN 110 may further include an LCM function entity 113. The LCM function entity 113 is configured to perform life cycle management on the USN 120, for example, activate the USN 120 or deactivate the USN 120. The LCM function entity may be software, hardware, a combination of software and hardware, or the like. An entity that can implement a life cycle management function may be equivalent to the LCM function entity in embodiments of this disclosure.

In a possible implementation, the access management function entity, the AUTH function entity, or the LCM function entity may be integrated together, or may be disposed separately.

It should be understood that, when the NSN 110 includes two or more function entities, the two or more function entities included in the NSN 110 may communicate with each other through an internal interface. For example, if the two function entities included in the NSN 110 are implemented by software, the two function entities may communicate with each other by invoking a simple internal function. In comparison with an external interface between the NSN 110 and the USN 120, a standard interface and a standard communication protocol do not need to be defined for the internal interface.

The USN 120 may include the following function entities: a data forwarding function entity, a session management function entity, and a user data storage function entity. The function entities included in the USN may communicate with each other through the internal interface. For example, if the two function entities included in the USN 120 are implemented by software, the two function entities may communicate with each other by invoking the simple internal function. In comparison with the external interface between the NSN 110 and the USN 120, a standard interface and a standard communication protocol do not need to be defined for the internal interface.

An SM function entity is configured to establish a connection between the USN 120 and the terminal device. The SM function entity may be software, hardware, a combination of software and hardware, or the like. An entity that can implement a session management function may be equivalent to the SM function entity in embodiments of this disclosure.

The data forwarding function entity is configured to receive or send data, for example, receive the data from a radio access network (radio access network, RAN) device, or send the data to the RAN device. The data forwarding function entity may be software, hardware, a combination of software and hardware, or the like. An entity that can implement a data forwarding function may be equivalent to the data forwarding function entity in embodiments of this disclosure.

The user data storage function entity is configured to store first information. The first information may include one or more of the following: information that needs privacy protection, identity information of a terminal device served by the USN 120, and identity information of a user. The information that needs privacy protection may include any one of the following: subscription data of the user, personal information, and property account information. The identity information of the user may include any one of the following: a name, a gender, and an identity card number. The identification information of the terminal device may include any one of the following: an international mobile subscriber identity (international mobile subscriber identity, a subscription permanent identifier (subscription permanent identifier, SUPI), and a phone number. The user data storage function entity may further store a mapping relationship between the identity information of the user and an address, and/or, a mapping relationship between the identity information of the user and an identity of the user in an application. The identity of the user in the application may be an account name registered by the user in the application, and the address includes a routable address (routing locator, RLOC) and a local address (local locator, LLOC).

The user data storage function entity may further provide a part or all of the stored first information for a third party based on an indication of the terminal device served by the USN 120. The third party may be another operator different from a home operator of the terminal device, may be an application on the terminal device, or may be another terminal device. This is not limited in embodiments of this disclosure.

In a possible implementation, the USN 120 may further include at least one of the following function entities that perform communication through the internal interface: a PM function entity, an authentication and authorization (authentication, authorization, and accounting, AAA) function entity, or an MMM function entity. For example, when the USN 120 further includes the PM function entity, the PM function entity may communicate with any one of the data forwarding function entity, the session management function entity, and the user data storage function entity through the internal interface. Similarly, the AAA function entity or the MM function entity may also communicate with any one of the data forwarding function entity, the session management function entity, and the user data storage function entity through the internal interface. For another example, when the USN 120 further includes the PM function entity and the AAA function entity, the PM function entity and the AAA function entity may communicate with each other through the internal interface. The PM function entity and the AAA function entity may further separately communicate with any one of the data forwarding function entity, the session management function entity, and the user data storage function entity through the internal interface.

The PM function entity is configured to guide a unified policy framework of network behavior. The PM function entity may be software, hardware, a combination of software and hardware, or the like. An entity that can implement a policy management function may be equivalent to the PM function entity in embodiments of this disclosure.

The AAA function entity is configured to perform authentication, authorization, accounting, and the like for a user. The AAA function entity may be software, hardware, a combination of software and hardware, or the like. An entity that can implement authentication, authorization, and accounting functions may be equivalent to the AAA function entity in embodiments of this disclosure.

The MINI function entity is configured to perform mobility management, for example, lawful interception. The MINI function entity may be software, hardware, a combination of software and hardware, or the like. An entity that can implement a mobility management function may be equivalent to the MM function entity in embodiments of this disclosure.

It should be understood that a plurality of function entities included in the USN 120 may be separately disposed, or may be integrated. This is not limited in embodiments of this disclosure.

Figure 6:
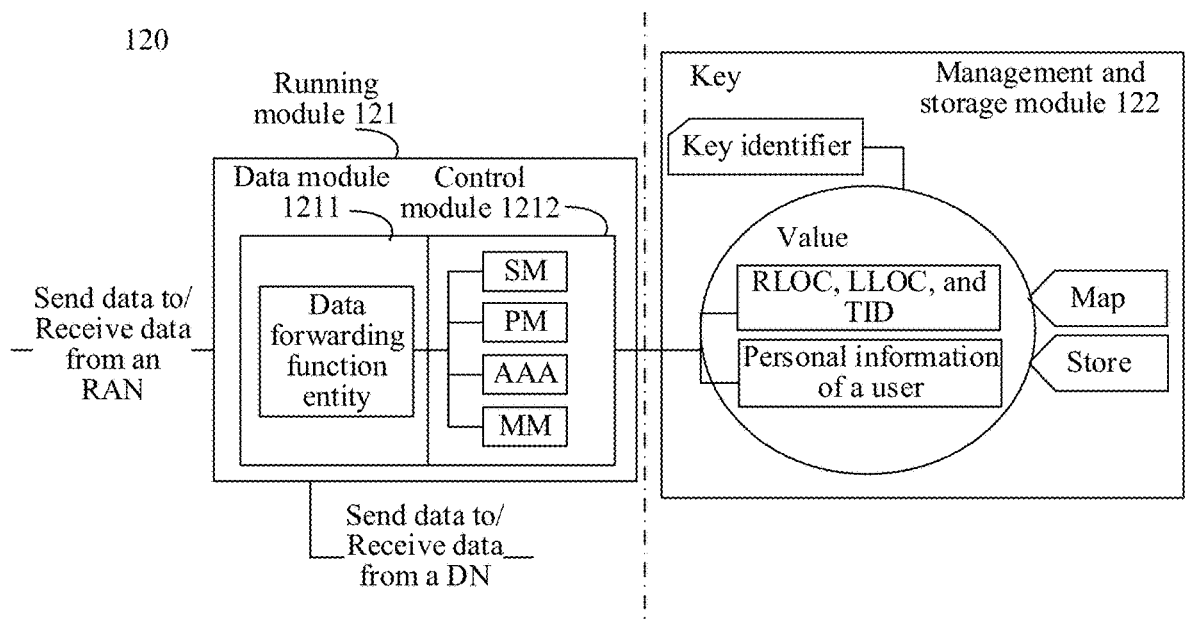
FIG. 6 is a schematic diagram of a structure of a USN.

FIG. 6 is an example of a schematic diagram of a structure of a USN 120. As shown in FIG. 6, the USN 120 may send data to a radio access network (radio access network, RAN) device, or receive the data from the RAN device. Alternatively, the USN 120 may receive data from a data network (data network, DN), or send the data to the DN.

The USN 120 shown in FIG. 6 includes a running module 121. The running module 121 mainly includes a data forwarding function entity, an SM function entity, a PM function entity, an AAA function entity, and an MINI function entity. The data forwarding function entity and another function entity may be integrated together, or may be disposed separately. For example, the data forwarding function entity and another function entity may be disposed independently, that is, the data forwarding function entity may be an independent module, for example, may be referred to as a data module 1211. The SM function entity, the PM function entity, the AAA function entity, and the MM function entity may be integrated together, or may be separately disposed. For example, the SM function entity, the PM function entity, the AAA function entity, and the MINI function entity may be integrated together, and are referred to as a control module 1212.

The USN 120 shown in FIG. 6 further includes a management and storage module 122. The management and storage module 122 may correspond to the user data storage function entity described above. For example, as shown in FIG. 6, the management and storage module 122 may store personal information of a user, and may further store a mapping relationship between the personal information of the user and a temporary identifier (temporary identifier, TID), and/or a mapping relationship between the personal information of the user and an RLOC and between the personal information of the user and an LLOC. The TID may correspond to the identity of the user in the application described above.

As described above, the USN 120 has an identifier corresponding to the USN 120, and identification information of a terminal device, the identifier of the USN 120, and information stored in the USN 120 may be stored in a key-value (key-value) pair manner. As shown in FIG. 6, a key in FIG. 6 may correspond to the identification information of the terminal device, a key identifier may correspond to the identifier of the USN 120, and a value may correspond to the information stored in the USN 120. When the identification information (key) of the terminal device is obtained, the identifier (key identifier) of the USN 120 may be obtained based on the identification information of the terminal device. Further, the information stored in the USN 120 may be indexed based on the identifier of the USN 120.

It should be understood that, in embodiments of this disclosure, FIG. 6 is merely used as an example to describe the structure of the USN 120, and should not constitute any limitation on embodiments of this disclosure. USNs 120 serving different terminal devices 140 may include different function entities. For example, a USN 120 that provides a service for a non-mobile terminal device 140 may include no MM function entity. For another example, a USN 120 that provides a service for a terminal device 140 that needs no authentication, authorization, and accounting function may include no AAA function entity.

It should be further understood that names of the modules included in the USN 120 in embodiments of this disclosure are merely examples, and should not constitute a limitation on embodiments of this disclosure. The modules included in the USN 120 may alternatively be named other names. For example, the management and storage module may be named a user data storage function entity or a user data storage module.

Figure 7:
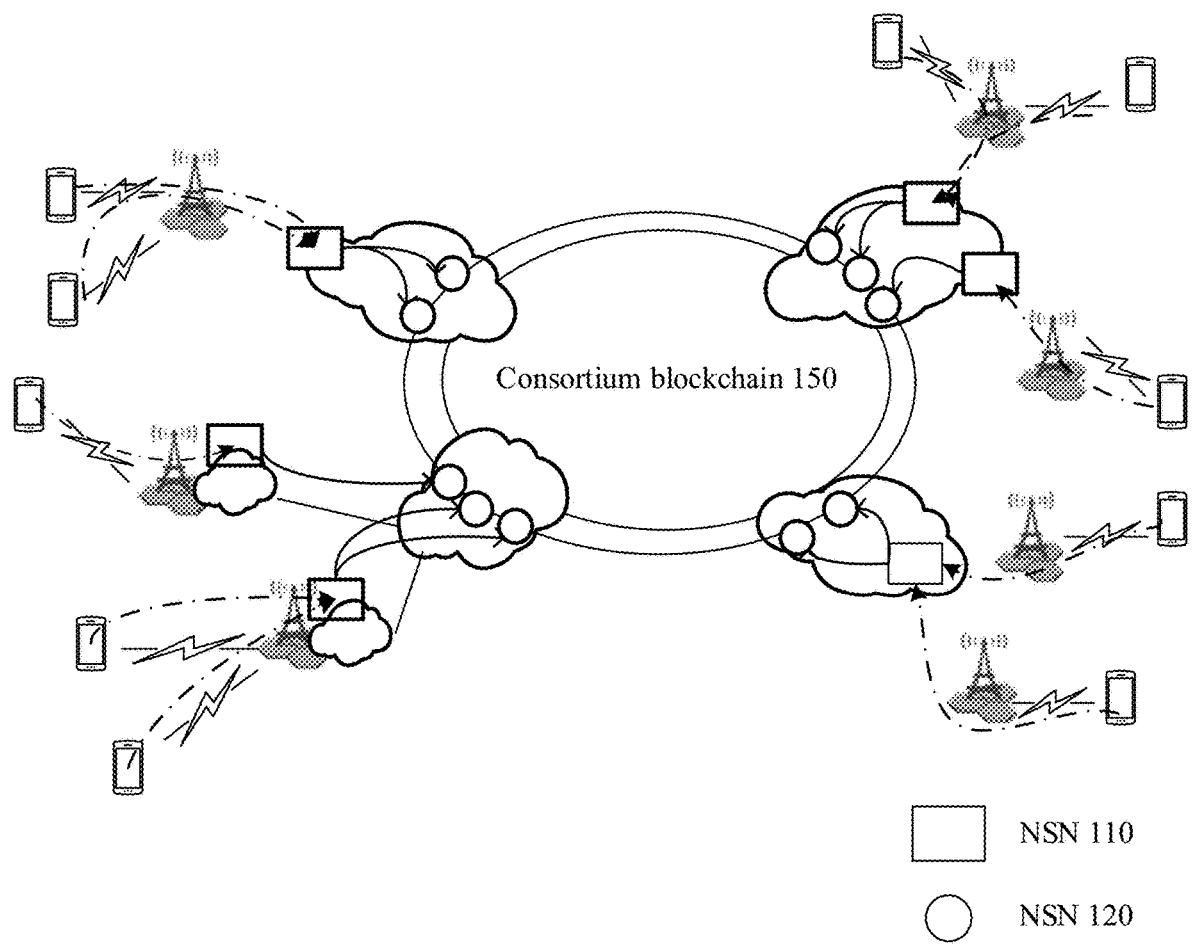
FIG. 7 is a schematic diagram of a communication system according to another embodiment of this disclosure.

In a possible implementation, as shown in FIG. 7, a communication system 100 provided in embodiments of this disclosure may further include a consortium blockchain (consortium blockchain, CBC) 150.

The CBC 150 may include a plurality of operator networks. A main function is to store second information. The second information may include one or more of the following: a transaction record between a user and an operator, and a public key of an operator network. A storage address of the second information in the CBC 150 may be indicated by first information stored in a USN 120. For example, after the user signs a contract with the operator, the operator stores the transaction record in the CBC 150, signs subscription content by using a private key of the operator network, and sends the subscription content as a digital credential to the USN 120. The USN 120 stores the subscription content offline. In other words, the plurality of operators included in the CBC 150 can only view the transaction record between the user and the operator in the CBC 150, and there is no specific subscription content in the CBC 150.

The CBC 150 may alternatively include digital asset management organizations of a plurality of banks, or may include a plurality of identity management organizations, or may include digital asset management organizations of a plurality of universities. In this case, the CBC 150 may alternatively store a public key of the digital asset management organization of the bank, a public key of the identity management organization, or a public key of the digital asset management organization of the university. The CBC 150 may alternatively store a service record or a transaction record provided by the bank, the identity management organization, or the university for the user.

In a possible implementation, the CBC 150 may be replaced by a distributed ledge technology (distributed ledge technology, DL/DLT). The DLT is a database that is distributed on a plurality of nodes or computer devices. The nodes are geographically distributed in a plurality of networks, organizations, or countries. It can be learned that the CBC 150 is a form of the DLT. When the CBC 150 is replaced by the DLT, more users can view the subscription record between the operator and the user.

The CBC 150 or the DLT may communicate with the USN 120 through a communication interface. For example, FIG. 4 shows a communication interface R6 between the USN 120 and the DL. It should be understood that in embodiments of this disclosure, that the communication interface between the USN 120 and the DL is named R6 is merely used as an example, and should not constitute a limitation on embodiments of this disclosure.

It should be understood that names of the NSN and the USN included in the communication system 100 in embodiments of this disclosure are merely examples, and should not constitute a limitation on embodiments of this disclosure. The NSN or the USN may also be named in another form. It should be understood that, a network unit that can be used as an initial access point of a terminal device on a core network side and that can implement an access management function and/or a user authentication function may be equivalent to the NSN in embodiments of this disclosure even if the network unit and the NSN have different names. A network unit that is associated with one terminal device or a group of terminal devices and that can provide functions such as data forwarding, session management, and user data storage for the terminal device may be equivalent to the USN in embodiments of this disclosure even if the network unit and the USN have different names.

In embodiments of this disclosure, the communication system including two types of network elements (the NSN and the USN) is proposed. The NSN communicates with the USN through an external interface, and a plurality of function entities included in the USN communicate with each other through an internal interface. In this way, when the communication system can provide a network service for the terminal device, external interfaces, protocols, and signaling interaction in the communication system are reduced, and complexity of the communication system is reduced.

In addition, the USN is associated with one terminal device or a group of terminal devices, so that the USN can provide a personalized service for the associated terminal device or the group of associated terminal devices. This can meet ultra-high personalized service requirements, quality of service (quality of service, QoS), and the like of different terminal devices, to implement user-centricity. A user-centric communication system is more suitable for multi-terminal device type requirements for connectivity of everything. Risks are avoided such as a single-point failure and being vulnerable to a DDoS attack in conventional centralized deployment on a core network.

In addition, in embodiments of this disclosure, distributed storage of data can be implemented by forming a DHT using USNs.

In addition, in embodiments of this disclosure, information that needs privacy protection is stored in the USN, and information that does not need privacy protection, such as the transaction record between the user and the operator, is stored in the consortium blockchain, so that the user can independently control privacy data of the user, a data privacy protection requirement is met, and trustworthiness certification of a data source and data integrity is implemented.

The following describes a communication method provided in embodiments of this disclosure with reference to FIG. 8a to FIG. 11.

Figure 8A:
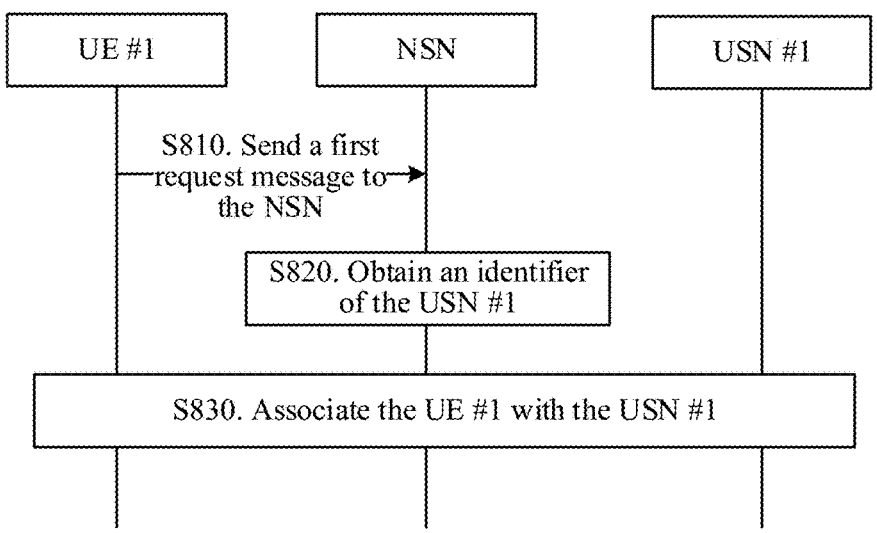
FIG. 8a is a schematic flowchart of a communication method according to an embodiment of this disclosure.

FIG. 8a is a schematic flowchart of a communication method 800 according to an embodiment of this disclosure. The method 800 may be applied to the communication system 100 shown in FIG. 3 or FIG. 7. As shown in FIG. 8a, the method 800 may include S810 to S830. The following describes each step in detail.

S810. UE #1 (an example of a terminal device) sends a first request message to an NSN. Correspondingly, in S810, the NSN receives the first request message from the UE #1.

The first request message is for requesting access, and the first request message may include identification information of the UE #1. The identification information of the UE #1 may be an international mobile subscriber identity (international mobile subscriber identity, IMSI), or may be a subscription permanent identifier (subscription permanent identifier, SUPI), or may be information that can uniquely identify the UE #1, such as a phone number. This is not limited in this embodiment of this disclosure.

It should be understood that, after the UE #1 (a user) signs a contract with an operator, the operator allocates a USN to the UE #1, for example, allocates the USN (corresponding to a USN #1 in the following), and uses an identifier obtained based on the identification information of the UE #1 as a node identifier of the USN #1. Before the UE #1 accesses a network, the USN allocated by the operator to the UE #1 is in an inactive state.

Figure 9:
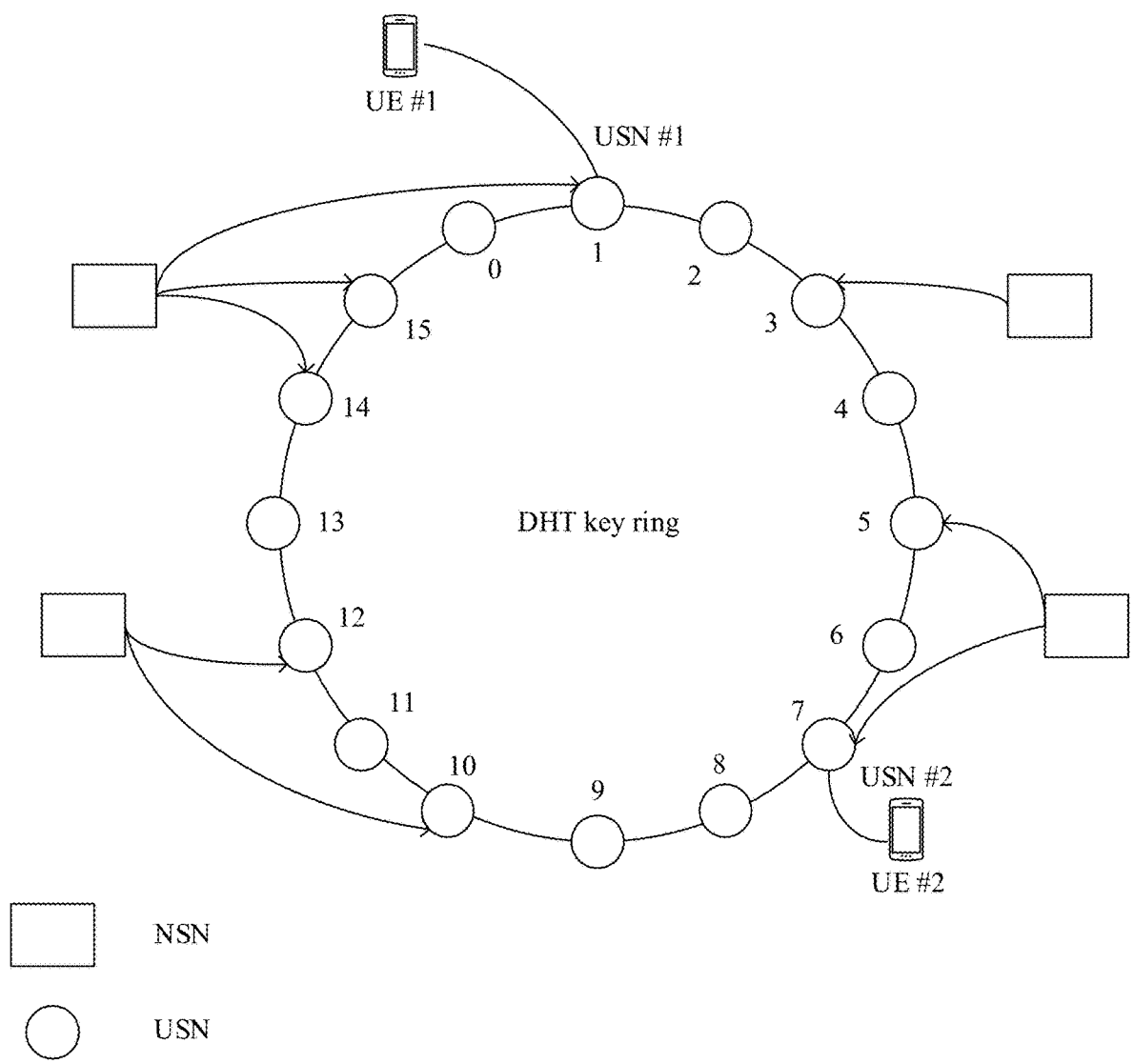
FIG. 9 is a schematic diagram of a communication system according to an embodiment of this disclosure.

In a possible implementation, as shown in FIG. 9, the USN allocated by the operator to the UE #1 may be a node on a DHT key ring generated by the operator. The DHT key ring generated by the operator may be understood as that the node on the DHT key ring may be the USN deployed by the operator.

In a possible implementation, the first request message sent by the UE #1 to the NSN may carry an identifier of the USN #1.

S820. The NSN obtains the identifier of the USN #1.

The NSN may obtain the identifier of the USN #1 based on the identification information of the UE #1. There may be a mapping relationship between the identification information of the UE #1 and the identifier of the USN #1. Therefore, the NSN may obtain the identifier of the USN #1 based on the mapping relationship between the identification information of the UE #1 and the identifier of the USN #1.

The NSN may alternatively process the identification information of the UE #1 to obtain the identifier of the USN #1. For example, the NSN may perform hash (hash) calculation on the identification information of the UE #1, to obtain the identifier of the USN #1. For example, the NSN may perform hash calculation on an MST/SUPI/phone number of the UE #1, to obtain the identifier of the USN #1.

Figure 8B:
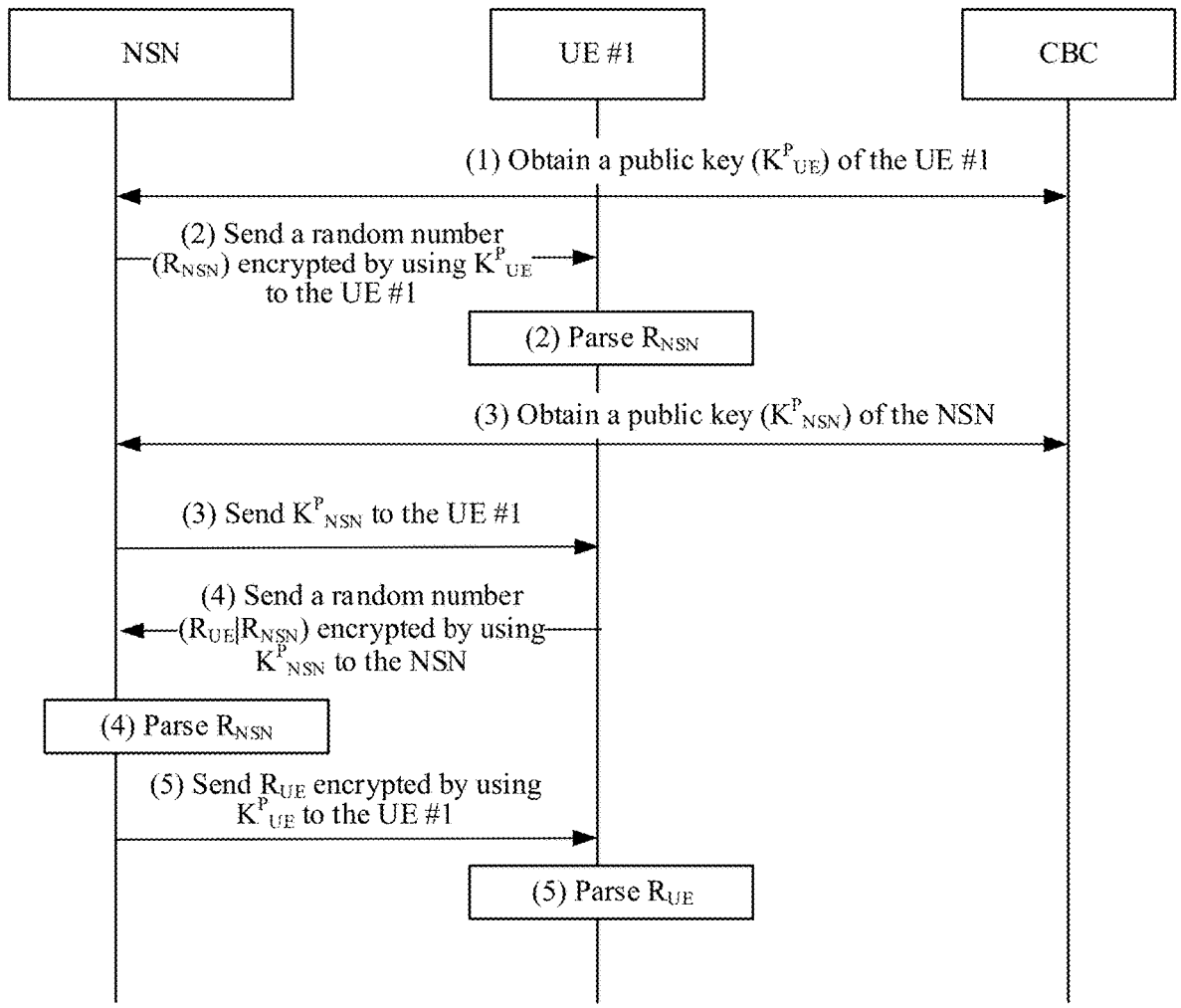
FIG. 8b is a schematic flowchart of a method for performing authentication between an NSN and a terminal device according to an embodiment of this disclosure.

In a possible implementation, the NSN may obtain the identifier of the USN #1 based on the identification information of the UE #1 when authentication on the UE #1 succeeds. A method for performing authentication on the UE #1 by the NSN may be an authentication method based on a consortium blockchain. A method procedure for performing authentication on the UE #1 by the NSN is shown in FIG. 8b, and may include the following steps.

(1) The NSN obtains a public key (denoted as $K^P_{UE}$) of the UE #1 from the CBC.

(2) The NSN generates a random number (denoted as $R_{NSN}$), encrypts $R_{NSN}$ by using $K^P_{UE}$, and sends encrypted $R_{NSN}$ To the UE #1. Correspondingly, after receiving $R_{NSN}$ that is sent by the NSN and encrypted by using $K^P_{UE}$, the UE #1 decrypts $R_{NSN}$ by using a private key (denoted as $K^S_{UE}$) of the UE #1, to obtain $R_{NSN}$.

(3) The NSN obtains the public key (denoted as $K^P_{NSN}$) of the NSN from the CBC, and sends $K^P_{NSN}$ to the UE #1.

(4) UE generates a new random number (denoted as $R_{UE}$) and combines $R_{UE}$ with $R_{NSN}$ to form a random number $R_{UE}|R_{NSN}$, and the UE encrypts $R_{UE}|R_{NSN}$ by using $K^P_{NSN}$ and sends encrypted $R_{UE}|R_{NSN}$ to the NSN. For example, if $R_{UE}$ is 12 and $R_{NSN}$ is 14, $R_{UE}|R_{NSN}$ formed by combining $R_{UE}$ and $R_{NSN}$ is 1214. For example, if $R_{UE}$ is 0101 and $R_{NSN}$ is 1111, $R_{UE}|R_{NSN}$ formed by combining $R_{UE}$ and $R_{NSN}$ is 01011111. Correspondingly, after the NSN receives encrypted $R_{UE}|R_{NSN}$, if $R_{NSN}$ obtained by decrypting, by using a private key (denoted as $K^S_{NSN}$) of the NSN, encrypted $R_{UE}|R_{NSN}$ is equal to $R_{NSN}$ previously generated by the NSN, the NSN completes authentication on the UE #1.

(5) The NSN encrypts $R_{UE}$ by using $K^P_{UE}$, and sends encrypted $R_{UE}$ to the UE #1. Correspondingly, after receiving encrypted $R_{UE}$, the UE #1 decrypts $R_{UE}$ by using $K^S_{UE}$. If decrypted $R_{UE}$ is equal to $R_{UE}$ previously generated by the UE #1, the UE #1 completes authentication on the NSN.

In a possible implementation, if the first request message received by the NSN carries the identifier of the USN #1, S820 may not be performed in the method 800.

S830. The NSN associates the UE #1 with the USN #1.

That the NSN associates the UE #1 with the USN #1 may alternatively be understood as that the NSN binds the UE #1 with the USN #1, or the NSN establishes a correspondence between the UE #1 and the USN #1, or the NSN establishes a mapping relationship between the UE #1 and the USN #1.

The NSN assigns the USN #1 to the UE #1 as a dedicated virtual core network of the UE #1. In other words, the NSN associates the USN #1 with the UE #1.

As described above, before the UE #1 accesses the network, the USN allocated by the operator to the UE #1 is in the inactive state. Therefore, that the NSN assigns the USN #1 to the UE #1 may alternatively be understood as that the NSN activates the USN #1. In this embodiment of this disclosure, time at which the USN #1 is in the active state is not limited. The USN #1 may be always in the active state after being activated, or the USN #1 may be in a deactivate state after specific time after being activated.

For example, in FIG. 9, if the identifier of the USN #1 obtained by the NSN based on the identifier of the UE #1 is 1, the NSN assigns a USN whose node identifier is 1 to the UE #1.

After the UE #1 is associated with the USN #1, the USN #1 may provide a dedicated core network service for the UE, for example, a data forwarding function.

In this embodiment of this disclosure, based on a request of the UE, the NSN may obtain the identifier of the USN based on the identification information of the UE, and associate the USN corresponding to the identifier of the USN with the UE, so that the USN allocated by the operator to the UE can be activated, and the USN can provide the dedicated network service for the UE.

Figure 10:
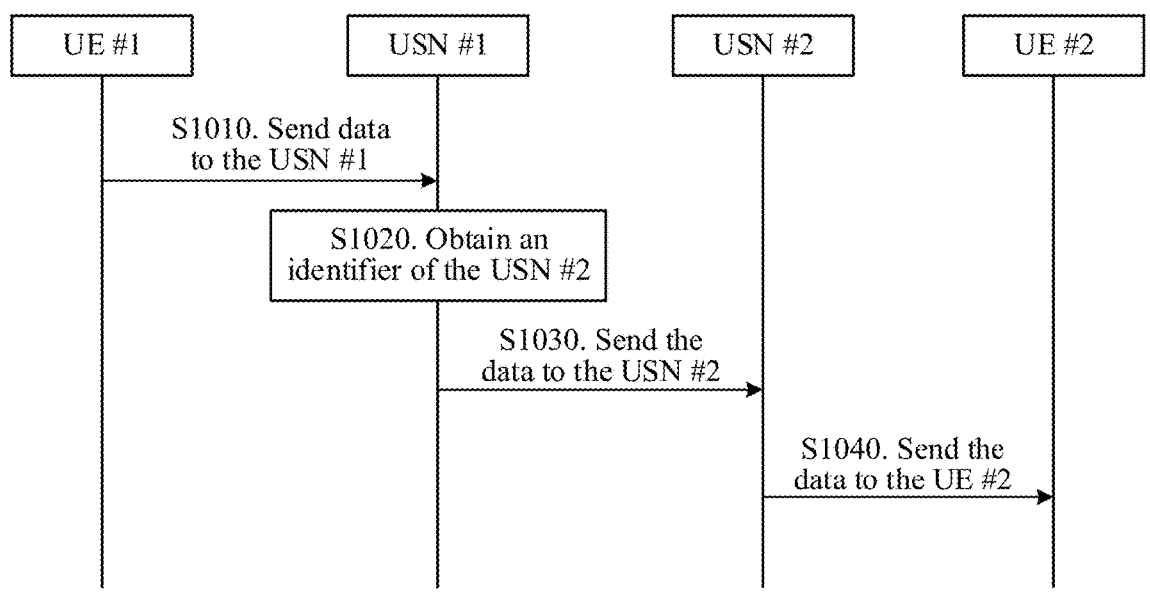
FIG. 10 is a schematic flowchart of a communication method according to another embodiment of this disclosure.

With reference to FIG. 10, the following describes a procedure in which the UE #1 forwards data by using the USN #1.

FIG. 10 is a schematic flowchart of a communication method 1000 according to an embodiment of this disclosure. The method 1000 may be applied to the communication system 100 shown in FIG. 3 or FIG. 7. As shown in FIG. 10, the method 1000 may include S1010 to S1040. The following describes each step in detail.

S1010. UE #1 (an example of a first terminal device) sends data to a USN #1 (an example of a first USN). Correspondingly, in S1010, the USN #1 receives the data from the UE #1.

It should be understood that the USN #1 is a USN serving the UE #1. For example, the USN #1 is a USN that serves only the UE #1, or a USN that serves only a UE group in which the UE #1 is located. The UE group in which the UE #1 is located may be UE in a same area, may be UE in a same enterprise, or may be UE having a same network requirement.

The data sent by the UE #1 to the USN #1 includes identification information of UE #2 (an example of a second terminal device), that is, it indicates that the data sent by the UE #1 to the USN #1 is data sent to the UE #2. The identification information of the UE #2 included in the data may be information that can uniquely identify the UE #2, such as an IMSI, an SUPI, or a phone number of the UE #2. This is not limited in this embodiment of this disclosure.

S1020. The USN #1 obtains an identifier of a USN #2 (an example of a second USN).

The USN #1 may obtain the identifier of the USN #2 based on the identification information of the UE #2. There may be a mapping relationship between the identification information of the UE #2 and the identifier of the USN #2. Therefore, the USN #1 may obtain the identifier of the USN #2 based on the mapping relationship between the identification information of the UE #2 and the identifier of the USN #2. It may be understood that, that there is the mapping relationship between the identification information of the UE #2 and the identifier of the USN #2 indicates that the identifier of the USN #2 may be uniquely determined based on the identification information of the UE #2.

The USN #1 may alternatively process the identification information of the UE #2 to obtain the identifier of the USN #2. For example, the USN #1 performs hash calculation on the identification information of the UE #2, to obtain the identifier of the USN #2. For example, the USN #1 may perform hash calculation on the IMSI/SUPI/phone number of the UE #2, to obtain the identifier of the USN #2.

S1030. The USN #1 sends the data to the USN #2. Correspondingly, in S1030, the USN #2 receives the data from the USN #1.

After obtaining the identifier of the USN #2 based on the identification information of the UE #2, the USN #2 sends the data to the USN #2 corresponding to the identifier of the USN #2. For example, in FIG. 9, the identifier of the USN #2 that is obtained by the USN #1 based on the phone number of the UE #2 is 7. In this case, the USN #1 may forward the data to a USN #2 whose node identifier is 7 by searching a routing table.

It should be understood that the USN #2 is a USN that provides a service for the UE #2. For example, the USN #2 is a USN that serves only the UE #2, or a USN that serves only a UE group in which the UE #2 is located. The UE group in which the UE #2 is located may be UE in a same area, may be UE in a same enterprise, or may be UE having a same network requirement.

S1040. The USN #2 sends the data to the UE #2. Correspondingly, in S1040, the UE #2 receives the data from the USN #2.

It should be understood that before the USN #2 sends the data to the UE #2, a connection has been established between the USN #2 and the UE #2. Specifically, for a method for establishing the connection between the UE #2 and the USN #2, refer to a method for establishing a connection between the UE #1 and the USN #1 described in the foregoing method 800. For brevity, details are not described herein again.

In this embodiment of this disclosure, a data forwarding procedure between the UE #1 and the UE #2 may be implemented by using the USN #1 and the USN #2.

Figure 11:
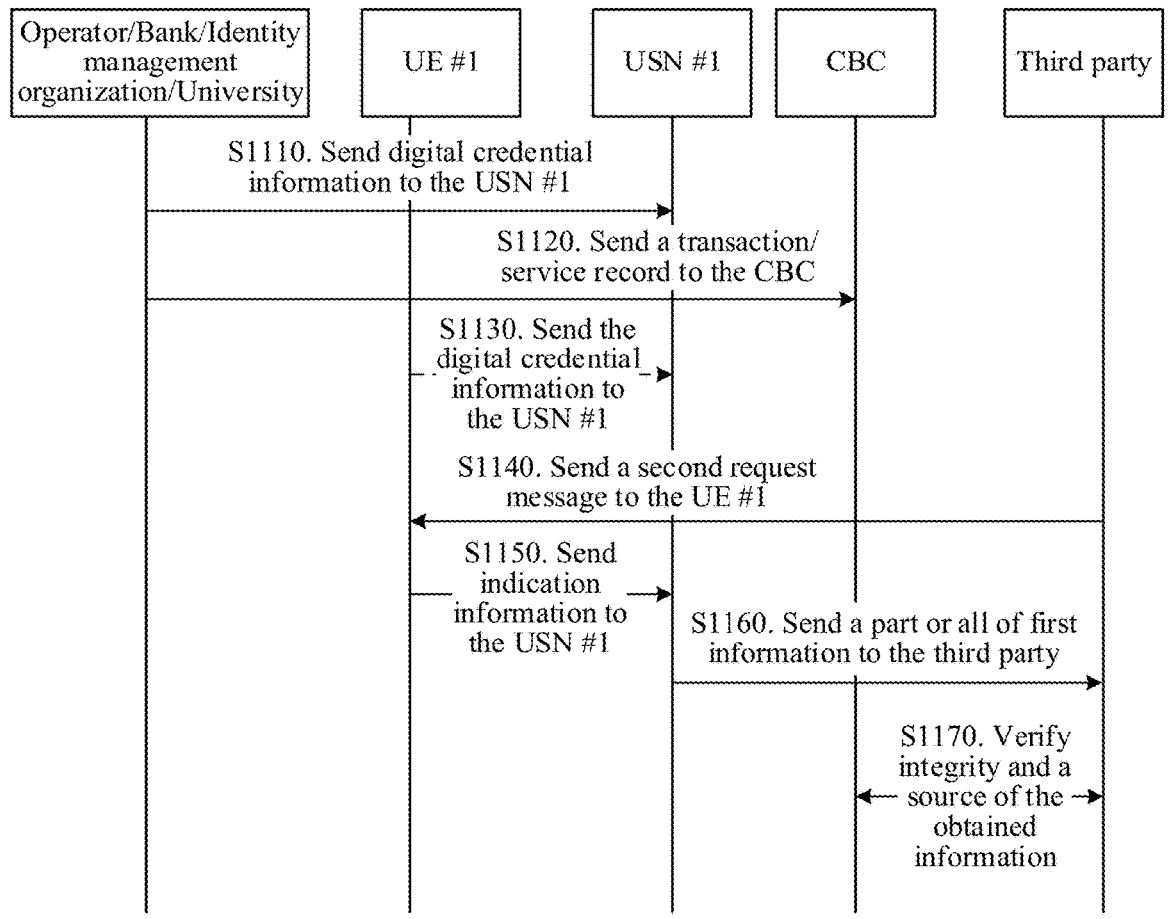
FIG. 11 is a schematic flowchart of a communication method according to still another embodiment of this disclosure.

With reference to FIG. 11, the following describes a method for implementing privacy protection by the UE #1 with reference to the USN #1 and a CBC.

FIG. 11 is a schematic flowchart of a communication method 1100 according to an embodiment of this disclosure. The method 1100 may be applied to the communication system 100 shown in FIG. 3 or FIG. 7. As shown in FIG. 11, the method 1100 may include the following steps.

S1110. An operator/a bank/an identity management organization/a university sends digital credential information to a USN #1 (an example of a first USN). Correspondingly, in S1110, the USN #1 receives the digital credential information from the bank, the identity management organization, or the university.

The digital credential information includes a digital credential, or the digital credential information indicates the digital credential. The following uses an example in which the digital credential information includes the digital credential for description.

In S1110, a data processing server managed by the operator/the bank/the identity management organization/the university may send the digital credential information to the USN #1. This is not limited in this embodiment of this disclosure. The following uses an example in which the data processing server managed by the operator/the bank/the identity management organization/the university sends the digital credential information to the USN #1 for description.

The digital credential may be obtained by a service provider (for example, the operator, the bank, the identity management organization, or the university) by signing a credential of a user by using a private key of the service provider. The user may be a user who uses the UE #1 (an example of a first terminal device). The credential of the user may be, for example, at least one of the following: identity information of the user, graduation certificate information, credit investigation information, and the like.

For example, the digital credential information sent by the data processing server managed by the operator to the USN #1 includes a digital credential signed by the operator, and the digital credential signed by the operator may be obtained by signing subscription content between the operator and the user based on a private key of an operator network.

The digital credential information sent by the data processing server managed by the bank to the USN #1 includes a digital credential signed by the bank, and the digital credential signed by the bank may be obtained by signing credit investigation information, property information, and the like of the user based on a private key of a digital asset management organization of the bank.

The digital credential information sent by the data processing server managed by the identity management organization to the USN #1 includes a digital credential signed by the identity management organization, and the digital credential signed by the identity management organization may be obtained by signing the identity information of the user based on a private key of an identity management organization network.

The digital credential information sent by the data processing server managed by the university to the USN #1 includes a digital credential signed by the university, and the digital credential signed by the university may be obtained by signing the graduation certificate information of the user based on a private key of a digital asset management organization of the university.

It should be understood that this embodiment of this disclosure is described by using only an example in which the data processing server managed by the operator/the bank/the identity management organization/the university sends the digital credential information to the USN #1. Any organization that provides a service for the user may sign the credential of the user by using a private key of the organization, to obtain a digital credential, and send the digital credential to the USN #1. The USN #1 stores the digital credential offline.

The following uses an interaction between the operator and a CBC as an example. For an interaction between the bank, the identity management organization, or the university and the CBC, refer to the interaction between the operator and the CBC.

S1120. The operator sends a transaction/service record to the CBC. Correspondingly, in S1120, the CBC receives the transaction/service record from the operator.

In S1120, the data processing server managed by the operator may send the transaction record to the CBC. This is not limited in this embodiment of this disclosure. The following uses an example in which the data processing server managed by the operator sends the transaction record to the CBC for description.

The transaction/service record sent by the data processing server managed by the operator to the CBC is a transaction/service record of a service provided by the user. After receiving the transaction/service record from the data processing server managed by the operator, the CBC stores the transaction/service record. A storage address of the transaction record between the operator and the user in the CBC may be indicated by the digital credential information sent by the operator to the USN #1. It may be understood that all other operators included in the CBC may obtain the transaction record from the CBC.

In a possible implementation, the operator may send a public key of the operator to the CBC. Correspondingly, the CBC stores the public key of the operator.

The data processing server managed by the operator/the bank/the identity management organization/the university may directly send the digital credential information to the USN #1. The USN #1 stores the digital credential information offline. Certainly, the operator, the bank, the identity management organization, the university, or the like may alternatively store the digital credential information in a computer-readable storage medium (for example, an optical disc or a USB flash drive) and deliver the digital credential information to the user. The user sends the digital credential information to the USN #1 via a terminal device, and the USN #1 stores the digital credential information offline. In this case, S1130 may be performed in the method 1100.

S1130. The UE #1 sends the digital credential information to the USN #1. Correspondingly, in S1130, the USN #1 receives the digital credential information from the UE #1.

The digital credential information includes the digital credential, or the digital credential information indicates the digital credential. The following uses an example in which the digital credential information includes the digital credential for description.

The digital credential included in the digital credential information sent by the UE #1 to the USN #1 may be one or more of the digital credentials described in S1120.

After receiving the digital credential information from the operator/the bank/the identity management organization/the university, or the like, the UE #1 sends the digital credential information to the USN #1. Correspondingly, the USN #1 stores the received digital credential information. It should be understood that the USN #1 is a USN that serves the UE #1. For example, the USN #1 is a USN that serves only the UE #1, or a USN that serves only a UE group in which the UE #1 is located. The UE group in which the UE #1 is located may be UE in a same area, may be UE in a same enterprise, or may be UE having a same network requirement.

In this embodiment of this disclosure, the operator/the bank/the identity management organization/the university stores the transaction/service record with the user in the CBC, and sends the credential of the user signed by using the private key to the user as the digital credential information, and the user stores the digital credential information offline (that is, stores the digital credential information in the USN #1). The digital credential included in the digital credential information may further point to an address of the transaction/service record stored in the CBC, so that privacy protection and data security and trustworthiness can be implemented.

In a possible implementation, the method 1100 may further include S1140 to S1170.

S1140. A third party sends a second request message to the UE #1. Correspondingly, in S1140, the UE #1 receives the second request message from the third party.

The second request message is for requesting to obtain a part or all of first information. The first information may include one or more of the following: information that needs privacy protection, identity information of the UE #1, and identity information of the user. The information that needs privacy protection may include the digital credential described in S1110 to S1130.

For example, the second request message may request the digital credential signed by the operator, the second request message may alternatively request the digital credential signed by the identity management organization, the second request message may alternatively request the digital credential signed by the university, and the second request message may alternatively request all the digital credentials stored in the USN #1.

The third party may be another operator different from a home operator of the terminal device, may be an application on the terminal device, or may be another terminal device. This is not limited in this embodiment of this disclosure.

S1150. The UE #1 sends indication information to the USN #1. Correspondingly, in S1150, the USN #1 receives the indication information from the UE #1.

The indication information indicates the USN #1 to provide a part or all of the first information for the third party.

Specifically, when the UE #1 successfully verifies the third party, the UE #1 indicates the USN #1 to provide a part or all of the first information for the third party. The UE #1 may indicate the USN #1 to provide, for the third party, all information requested by the third party, or may indicate the USN #1 to provide, for the third party, a part of information in the information requested by the third party. In other words, the UE #1 may independently determine content in the first information to be displayed to the third party.

S1160. The USN #1 sends a part or all of the first information to the third party. Correspondingly, in S1160, the third party receives a part or all of the first information from the USN #1.

It may be understood that, when the USN #1 sends only a part of the first information to the third party, the third party can obtain only the part of the first information that is sent by the USN #1, but cannot obtain a remaining part of the first information that is not sent by the USN #1.

In a possible implementation, the USN #1 may send a part of the first information to the third party by using a zero-knowledge proof (zero-knowledge proof, ZKP) algorithm.

It should be understood that the USN #1 may further store data having no special requirement. For the data having no special requirement, even if the third party does not request the data, the UE #1 may directly indicate the USN #1 to provide the data for the third party. In this case, the third party can directly obtain the data without consent of the user.

S1170. The third party verifies, by using the CBC, integrity and a source of the obtained information.

After obtaining a part or all of the first information, the third party may obtain, from the CBC based on a storage address indicated by the first information, second information stored at the storage address, and may verify, based on the second information, the integrity and whether the source of the obtained first information is reliable. The second information may include one or more of the following: the transaction record between the user and the operator, and a public key of the operator network.

For example, if the third party obtains, from the USN #1, the digital credential of subscription content between the user and the operator, the third party may obtain the transaction record between the user and the operator from the CBC based on the obtained digital credential. It may be understood that the transaction record corresponds to the subscription content. Therefore, the third party may verify integrity and a source of the subscription content based on the transaction record.

In this embodiment of this disclosure, when receiving a request message of the third party, the UE #1 may independently determine to provide a part or all of the first information for the third party, so that privacy data can be independently controlled.

Embodiments described in this specification may be independent solutions, or may be combined based on internal logic. These solutions all fall within the protection scope of this disclosure.

The communication system and the network device provided in embodiments of this disclosure are described above in detail with reference to FIG. 3 and FIG. 11. The following describes in detail a communication apparatus provided in embodiments of this disclosure with reference to FIG. 12 to FIG. 14.

Figure 12:
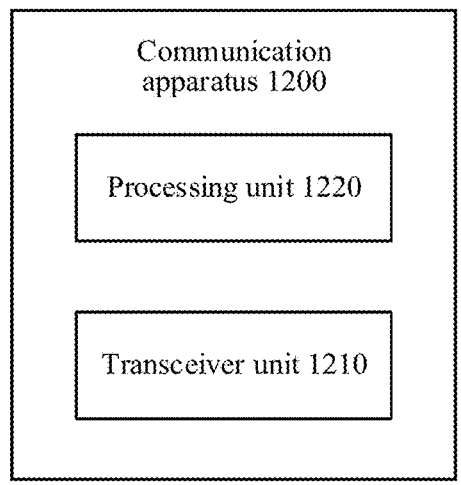
FIG. 12 is a schematic diagram of a communication apparatus according to an embodiment of this disclosure.

FIG. 12 is a schematic block diagram of a communication apparatus 1200 according to an embodiment of this disclosure. As shown in the figure, the apparatus 1200 may include a transceiver unit 1210 and a processing unit 1220. The transceiver unit 1210 may communicate with the outside, and the processing unit 1220 is configured to process data. The transceiver unit 1210 may also be referred to as a communication interface or a communication unit.

In a possible design, the apparatus 1200 may implement steps or procedures performed by the USN #1 in the foregoing embodiments, for example, may be the USN #1, or a chip or a circuit configured in the USN #1. The transceiver unit 1210 is configured to perform a receiving/sending-related operation on a USN #1 side in the foregoing embodiments, and the processing unit 1220 is configured to perform a processing-related operation of the USN #1 in the foregoing embodiments.

The transceiver unit 1210 may correspond to the data forwarding function entity in FIG. 6, or may correspond to the running module 121 in FIG. 6, or may correspond to the data module 1211 in FIG. 6.

The processing unit 1220 may correspond to the SM function entity, the PM function entity, the AAA function entity, and the MM function entity in FIG. 6, or may correspond to the control module 1212 in FIG. 6, or may correspond to the management and storage module 122 in FIG. 6.

In a possible implementation, the apparatus 1200 may implement steps or procedures performed by the USN #1 in the methods 800 to 1100 according to embodiments of this disclosure, and the apparatus 1200 may include units configured to perform the method performed by the USN #1 in the method 800 in FIG. 8a, the method 1000 in FIG. 10, or the method 1100 in FIG. 11. In addition, units in the apparatus 1200 and the foregoing other operations and/or functions are separately intended to implement corresponding procedures in the method 800 in FIG. 8a, the method 1000 in FIG. 10, or the method 1100 in FIG. 11.

It should be understood that a specific process in which the units perform the foregoing corresponding steps is described in detail in the foregoing method embodiments, and for brevity, details are not described herein.

In still another possible design, the apparatus 1200 may implement the steps or procedures performed by the NSN in the foregoing embodiments, for example, may be the NSN, or a chip or a circuit configured in the NSN. The transceiver unit 1210 is configured to perform a receiving/sending-related operation on an NSN side in the foregoing embodiments, and the processing unit 1220 is configured to perform a processing-related operation of the NSN in the foregoing embodiments.

Figure 5:
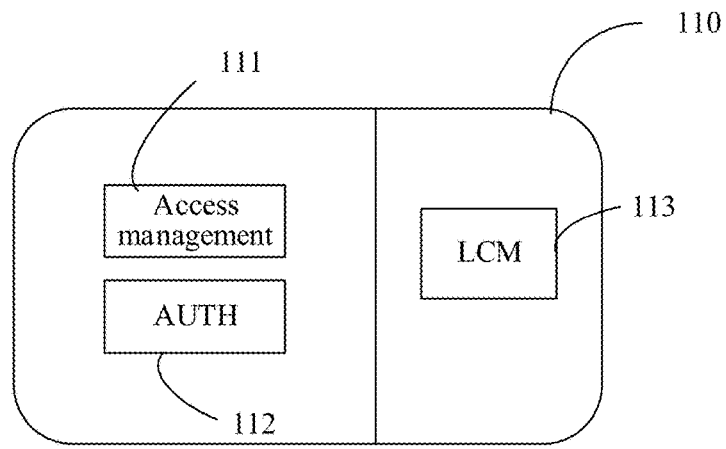
FIG. 5 is a schematic diagram of a structure of an NSN.

The transceiver unit 1210 may correspond to the access management function entity in FIG. 5.

The processing unit 1220 may correspond to the AUTH function entity and the LCM function entity in FIG. 5.

In a possible implementation, the apparatus 1200 may implement the steps or the procedures performed by the NSN in the method 800 in embodiments of this disclosure, and the apparatus 1200 may include units configured to perform the method performed by the NSN in the method 800 in FIG. 8a. In addition, the units in the apparatus 1200 and the foregoing other operations and/or functions are separately intended to implement the corresponding procedures in the method 800 in FIG. 8a.

It should be understood that a specific process in which the units perform the foregoing corresponding steps is described in detail in the foregoing method embodiments, and for brevity, details are not described herein.

Figure 13:
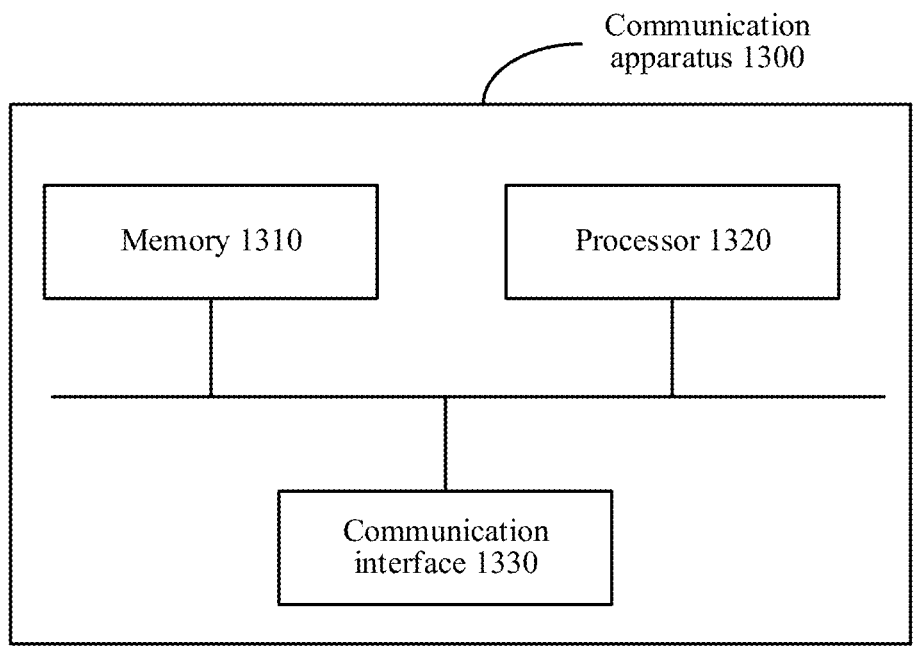
FIG. 13 is a schematic block diagram of a communication apparatus according to another embodiment of this disclosure.

FIG. 13 is a schematic block diagram of a communication apparatus according to another embodiment of this disclosure. A communication apparatus 1300 shown in FIG. 13 may include a memory 1310, a processor 1320, and a communication interface 1330. The memory 1310, the processor 1320, and the communication interface 1330 are connected through an internal connection path. The memory 1310 is configured to store instructions. The processor 1320 is configured to execute the instructions stored in the memory 1310. Optionally, the memory 1310 may be coupled to the processor 1320 through an interface, or integrated with the processor 1320.

It should be noted that the communication interface 1330 uses a transceiver apparatus such as but not limited to a transceiver, to implement communication between the communication apparatus 1300 and another device or a communication network. The communication interface 1330 may further include an input/output interface (input/output interface).

In an implementation process, the steps in the foregoing methods may be implemented by using a hardware integrated logic circuit in the processor 1320, or by using instructions in a form of software. The methods disclosed with reference to embodiments of this disclosure may be directly performed by using a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 1310, and the processor 1320 reads information in the memory 1310 and completes the steps in the foregoing methods with reference to hardware of the processor. To avoid repetition, details are not described herein.

It should be understood that, the processor in embodiments of this disclosure may be a central processing unit (central processing unit, CPU), another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It should be further understood that in embodiments of this disclosure, the memory may include the read-only memory and the random access memory, and provide instructions and data for the processor. A part of the processor may further include a non-volatile random access memory. For example, the processor may further store information of a device type.

Figure 14:
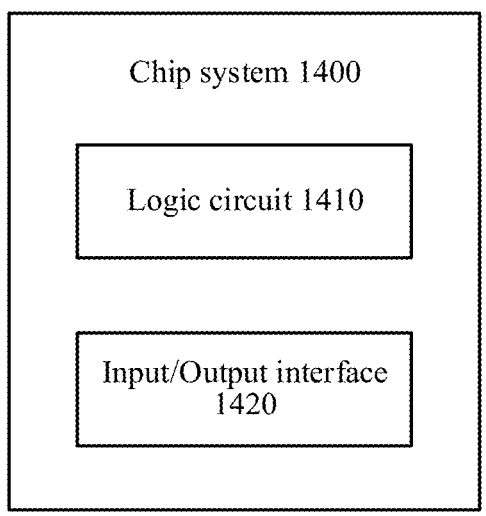
FIG. 14 is a schematic diagram of a chip system according to an embodiment of this disclosure.

FIG. 14 is a schematic diagram of a chip system according to an embodiment of this disclosure. The chip system 1400 shown in FIG. 14 includes a logic circuit 1410 and an input/output interface (input/output interface) 1420. The logic circuit may be coupled to the input interface, and perform data transmission through the input/output interface, to perform the method in FIG. 8a, FIG. 10, or FIG. 11.

An embodiment of this disclosure further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated chip (application-specific integrated circuit, ASIC), a system on chip (system on chip, SoC), a central processing unit (central processing unit, CPU), a network processor (network processor, NP), a digital signal processing circuit (digital signal processor, DSP), a micro controller unit (micro controller unit, MCU), a programmable controller (programmable logic device, PLD), or another integrated chip.

In an implementation process, steps in the foregoing methods may be implemented by using a hardware integrated logic circuit in the processor, or by using instructions in a form of software. The steps of the methods disclosed with reference to embodiments of this disclosure may be directly performed by a hardware processor, or may be performed by a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods with reference to hardware of the processor. To avoid repetition, details are not described herein.

It should be noted that, the processor in embodiments of this disclosure may be an integrated circuit chip, and has a signal processing capability. In an implementation process, steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in embodiments of this disclosure. The general-purpose processor may be a microprocessor, or the processor may be any conventional processor or the like. The steps of the methods disclosed with reference to embodiments of this disclosure may be directly performed by using a hardware decoding processor, or may be performed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods with reference to hardware of the processor.

It may be understood that the memory in embodiments of this disclosure may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example, and not limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these memories and any memory of another proper type.

According to the method provided in embodiments of this disclosure, this disclosure further provides a computer program product. The computer program product includes computer program code. When the computer program code is run on a computer, the computer is enabled to perform the method in any one of embodiments shown in the method 800, the method 1000, and the method 1100.

According to the method provided in embodiments of this disclosure, this disclosure further provides a computer-readable medium. The computer-readable medium stores program code. When the program code is run on a computer, the computer is enabled to perform the method in any one of embodiments of the method 800, the method 1000, and the method 1100.

All or a part of the foregoing embodiments may be implemented by software, hardware, firmware, or any combination thereof. When embodiments are implemented by software, all or a part of embodiments may be implemented in a form of a computer program product. The computer program product includes one or more computer instructions. When the computer instructions are loaded and executed on a computer, all or a part of the procedures or functions according to embodiments of this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, a solid-state drive (solid-state drive, SSD)), or the like.

Terms such as "component", "module", and "system" used in this specification indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. For example, the components may perform communication by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this disclosure, it should be understood that the disclosed system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part of or all of the units may be selected based on actual requirements to achieve the objectives of the solutions of embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the current technology, or a part of the technical solutions may be implemented in a form of a software product. The computer software product is stored in a storage medium, and includes several instructions for instructing a computer device (which may be a personal computer, a server, or a network device) to perform all or a part of the steps of the methods described in embodiments of this disclosure. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A communication system, comprising a network service node (NSN) and a user service node (USN), wherein:
the USN is associated with one or more terminal devices and comprises: a data forwarding function entity, a session management function entity, and a user data storage function entity, wherein the data forwarding function entity, the session management function entity, and the user data storage function entity communicate with each other through an internal interface; and
the NSN is configured to communicate with the USN through an external interface and comprises at least one of an authentication function entity or an access management function entity, wherein the NSN is configured to receive, from a terminal device via an access network device, a first request message used for requesting access and comprising identification information of the terminal device, obtain an identifier of the USN that is associated with the identification information of the terminal device and associate the USN with the terminal device.

2. The communication system of claim 1, wherein the USN further comprises at least one of the following function entities that perform communication through the internal interface: a policy management function entity, an authentication and authorization function entity, or a mobility management function entity.

3. The communication system of claim 1, wherein the NSN further comprises a life cycle management (LCM) function entity configured to perform life cycle management on the USN.

4. The communication system of claim 1, wherein the USN is a node in a distributed hash table (DHT) including a plurality of nodes.

5. The communication system of claim 1, wherein the user data storage function entity is configured to store first information including one or more of the following: information that needs privacy protection, identification information of the one or more terminal devices served by the USN, and identity information of a user.

6. The communication system of claim 5, wherein the communication system further comprises a consortium blockchain; wherein
the consortium blockchain is used to store second information including at least one of the following: a transaction record between a user and an operator or a public key of an operator network, and a storage address of the second information in the consortium blockchain is indicated by the first information.

7. The communication system of claim 5, wherein the USN is further configured to:
receive indication information from a terminal device, the indication information indicating the USN to provide at least part of the first information for a third party; and
provide the at least part of the first information for the third party.

8. The communication system of claim 1, wherein the user data storage function entity is further configured to store a mapping relationship including at least one of the following:
a mapping relationship between identity information of a user and an identity of the user in an application, or a mapping relationship between the identity information of the user and an address.

9. The communication system of claim 1, wherein the USN is configured to:
receive data from the first terminal device, the data including identification information of a second terminal device;
obtain an identifier of a second USN, wherein the identifier of the second USN is associated with identification information of the second terminal device; and
send the data to the second USN.

10. A communication method, comprising:
sending, by a terminal device, a first request message to a network service node (NSN) via an access network device, wherein the first request message is for requesting access and comprises identification information of the terminal device;
establishing, by the terminal device, a connection to a user service node (USN), wherein the USN is associated by the NSN with the identification information of the terminal device;
sending, by the terminal device to the USN, digital credential information including a digital credential, or the digital credential information indicating the digital credential;
receiving, by the terminal device from a third party, a second request message for requesting at least part of the digital credential; and
sending, by the terminal device to the USN, indication information indicating the USN to provide the at least part of the digital credential for the third party.

11. The method of claim 10, wherein the USN is a node in a distributed hash table (DHT) including a plurality of nodes.

12. A communication method, comprising:
receiving, by a network service node (NSN), a first request message from a terminal device via an access network device, wherein the first request message is for requesting access and comprises identification information of the terminal device;

obtaining, by the NSN, an identifier of a user service node (USN), wherein the identifier of the USN is associated with the identification information of the terminal device; and associating, by the NSN, the USN with the terminal device, wherein the USN is allocated by an operator to the terminal device and not activated before the NSN receives the first request message and the method further comprises:

activating, by the NSN, the USN for the terminal device; and performing, by the NSN, a life cycle management (LCM) on the USN for the terminal device after the NSN receives the first request message and associates the USN with the terminal device.

13. The method of claim 12, wherein the USN is a node in a distributed hash table (DHT) including a plurality of nodes, and the obtaining the identifier of the USN comprises:

performing, by the NSN, hash calculation on the identification information of the terminal device to obtain the identifier of the USN.

14. The method of claim 12, wherein the obtaining the identifier of the USN comprises:

obtaining, by the NSN, the identifier of the USN in accordance with a mapping relationship between the identification information of the terminal device and the identifier of the USN.

15. The method of claim 12, the method further comprising:

obtaining, by the NSN from a consortium blockchain (CBC), at least one of a public key of the NSN or a public key associated with the terminal device; and performing, by the NSN, an authentication on the terminal device in accordance with the at least one of the public key of the NSN or the public key associated with the terminal device.

16. The method of claim 15, the performing the authentication comprising:

sending, by the NSN, the public key of the NSN to the terminal device;

receiving, by the NSN from the UE, an encrypted random number that is encrypted by using the public key of the NSN.

17. The method of claim 15, the performing the authentication comprising:

generating, by the NSN, a random number; and sending, by the NSN to the terminal device, an encrypted random number that is encrypted by the public key of the UE.

* * * * *